US006785596B2

(12) United States Patent
Brandt et al.

(10) Patent No.: US 6,785,596 B2
(45) Date of Patent: Aug. 31, 2004

(54) FEATURES OF MAIN CONTROL COMPUTER FOR A POWER MACHINE

(75) Inventors: Kenneth A. Brandt, Wyndmere, ND (US); Scott R. Rossow, Kindred, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 334 days.

(21) Appl. No.: 09/749,356

(22) Filed: Dec. 27, 2000

(65) Prior Publication Data

US 2001/0007087 A1 Jul. 5, 2001

Related U.S. Application Data

(63) Continuation of application No. 09/298,671, filed on Apr. 23, 1999, now Pat. No. 6,202,014.

(51) Int. Cl.[7] ........................... E02F 9/20; G05B 15/02

(52) U.S. Cl. ......................... 701/50; 172/812; 172/263; 60/484

(58) Field of Search ...................... 701/50, 53; 184/6.1; 37/234; 74/501.5 H; 172/812, 263, 260.5; 298/22 C; 702/114; 137/883, 861; 60/484, 420, 427

(56) References Cited

U.S. PATENT DOCUMENTS

D265,648 S 8/1982 Fukushima et al. .......... D14/66
D269,073 S 5/1983 O'Driscoll ................. D10/125
4,447,860 A 5/1984 Stone et al. .................. 362/30
D275,944 S 10/1984 Ito ........................... D12/192
D276,844 S 12/1984 Eaton ......................... D10/125
4,570,151 A 2/1986 Martorano et al. ....... 340/52 R
4,606,313 A 8/1986 Izumi et al. ................ 123/386
4,716,262 A 12/1987 Morse ........................... 200/5
4,744,218 A 5/1988 Edwards et al. .............. 60/368
4,852,680 A 8/1989 Brown et al. ............... 180/287
4,910,662 A 3/1990 Heiser et al. ............... 364/167
4,926,331 A 5/1990 Windle et al. ......... 364/424.04
D316,393 S 4/1991 Kaczmarski ............... D12/192
5,048,293 A 9/1991 Aoyagi ........................ 60/420
5,079,919 A 1/1992 Nakamura et al. ............ 60/426
D327,858 S 7/1992 Avitan ....................... D10/125
5,134,583 A 7/1992 Hirata et al. .................. 60/420
5,186,000 A 2/1993 Hirata et al. .................. 60/420
D337,962 S 8/1993 Avitan ....................... D10/125
5,260,875 A 11/1993 Tofte et al. ................. 364/424
5,267,440 A 12/1993 Nakamura et al. ............ 60/426
D349,677 S 8/1994 Avitan ....................... D12/192
5,361,059 A 11/1994 Hoffman et al. ............ 340/438
D354,948 S 1/1995 Moodie ..................... D14/100
5,386,697 A 2/1995 Claudinon et al. ............ 60/420
5,404,443 A 4/1995 Hirata ........................ 395/161
5,425,431 A 6/1995 Brandt et al. ............... 180/273
5,430,266 A 7/1995 Austin, Jr. et al. .......... 200/302
5,446,655 A 8/1995 Fukuda et al. .............. 364/424
5,448,028 A 9/1995 Filion et al. .................. 200/52
D364,107 S 11/1995 Nesicolaci ................. D10/103
5,467,829 A 11/1995 Barton et al. ................ 172/4.5
D364,840 S 12/1995 Oshizawa et al. ......... D12/192
D371,345 S 7/1996 Martino ..................... D14/101
5,547,039 A 8/1996 Berger et al. ............... 180/287
5,558,178 A 9/1996 Hess et al. .................. 108/197

(List continued on next page.)

*Primary Examiner*—William A. Cuchlinski, Jr.
*Assistant Examiner*—Olga Hernandez
(74) *Attorney, Agent, or Firm*—Westman, Champlin & Kelly, P.A.

(57) ABSTRACT

The present invention is directed to a computer based control system for controlling hydraulic and electromechanical actuators on a power machine, such as a skid steer loader. The computer based control system is configured to implement a number of features to enhance certain operational aspects of the power machine.

8 Claims, 16 Drawing Sheets

U.S. PATENT DOCUMENTS

| | | | | | |
|---|---|---|---|---|---|
| 5,579,227 | A | | 11/1996 | Simmons, Jr. et al. | 364/424.03 |
| 5,586,620 | A | | 12/1996 | Dammeyer et al. | 187/227 |
| D382,569 | S | | 8/1997 | Esposito | D15/28 |
| 5,680,099 | A | | 10/1997 | Springston | 340/461 |
| 5,687,081 | A | | 11/1997 | Wellman et al. | 364/424 |
| 5,694,318 | A | | 12/1997 | Miller et al. | 364/424 |
| 5,711,508 | A | | 1/1998 | Schreiber et al. | 251/149.6 |
| 5,778,329 | A | * | 7/1998 | Officer et al. | 701/55 |
| 5,821,631 | A | | 10/1998 | Loraas et al. | 307/10.4 |
| D401,545 | S | | 11/1998 | Sacco et al. | D12/192 |
| 5,854,988 | A | | 12/1998 | Davidson et al. | 701/50 |
| D412,157 | S | | 7/1999 | Stevenson | D14/113 |
| 5,949,330 | A | | 9/1999 | Hoffman et al. | 340/438 |
| 5,974,367 | A | | 10/1999 | Bianco | 702/182 |
| 6,060,981 | A | | 5/2000 | Landes | 340/426 |
| 6,061,617 | A | | 5/2000 | Berger et al. | 701/50 |

* cited by examiner

FIG. 8
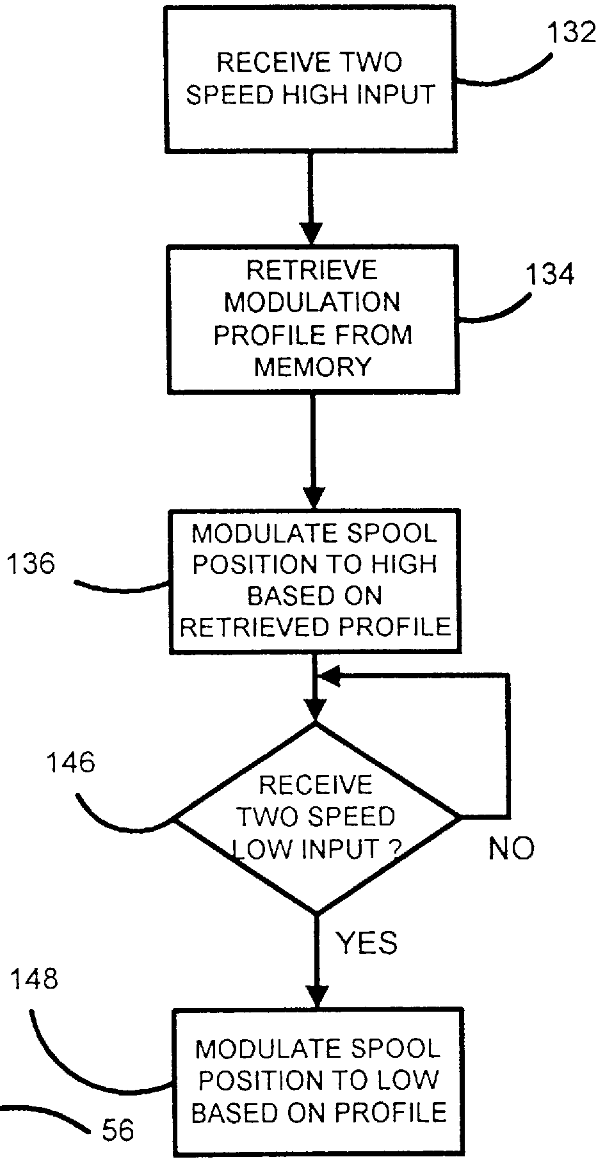
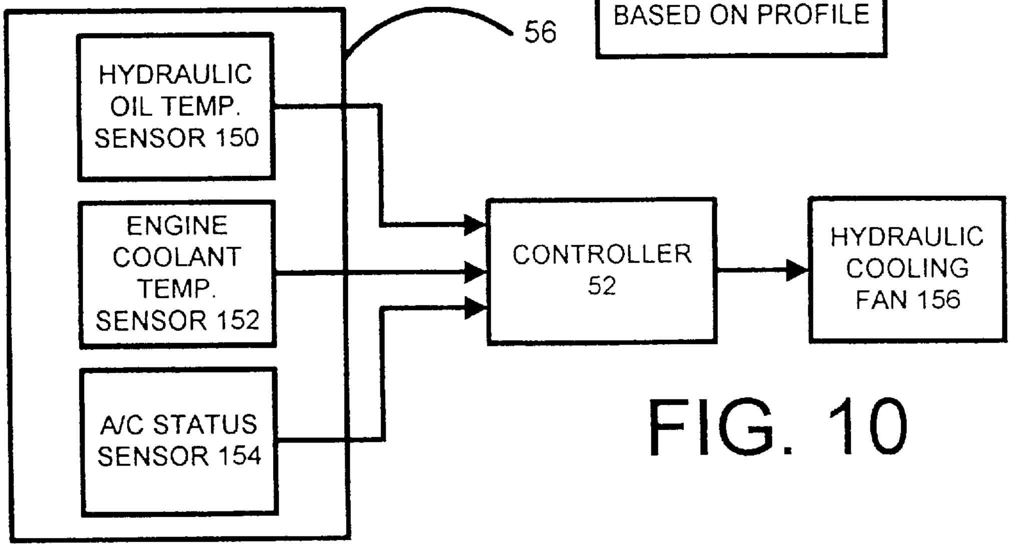
FIG. 10

FEATURES OF MAIN CONTROL COMPUTER FOR A POWER MACHINE

REFERENCE TO APPLICATION

This is a Continuation of application Ser. No. 09/298,671, filed Apr. 23, 1999 Now U.S. Pat. No. 6,202,014.

Reference is made to the following co-pending patent applications:

"DISPLAY PANEL FOR POWER MACHINE", Ser. No. 29/103,252, filed Apr. 12, 1999; and "DISPLAY PANEL FOR POWER MACHINE", Ser. No. 29/103,256, filed Apr. 12, 1999; and "DISPLAY PANEL FOR POWER MACHINE", Ser. No. 29/103,257, filed Apr. 12, 1999.

BACKGROUND OF THE INVENTION

The present invention generally relates to power machines. More specifically, the present invention relates to a main control computer for use with a power machine.

Power machines, such as skid steer loaders, typically have a frame which supports a cab and a movable lift arm which, in turn, supports a work tool such as a bucket. The movable lift arm is pivotally coupled to the frame of the skid steer loader by power actuators which are commonly hydraulic cylinders. In addition, the tool is coupled to the lift arm by one or more additional power actuators which are also commonly hydraulic cylinders. An operator manipulating the skid steer loader raises and lowers the lift arm, and manipulates the tool, by actuating the hydraulic cylinders coupled to the lift arm, and the hydraulic cylinders coupled to the tool. When the operator causes the hydraulic cylinders coupled to the lift arm to increase in length, the lift arm moves generally vertically upward. Conversely, when the operator causes the hydraulic cylinders coupled to the lift arm to decrease in length, the lift arm moves generally vertically downward. Similarly, the operator can manipulate the tool (e.g., tilt the bucket) by controlling the hydraulic cylinders coupled to the lift arm and the working tool to increase or decrease in length, as desired.

Skid steer loaders also commonly have an engine which drives a hydraulic pump to, in turn, power hydraulic traction motors which power movement of the skid steer loader. The traction motors are commonly coupled to the wheels through a drive mechanism such as a chain drive.

SUMMARY OF THE INVENTION

The present invention is directed to a computer-based control system for controlling hydraulic and electromechanical actuators on a power machine, such as a skid steer loader. The computer based control system is configured to implement a number of features to enhance certain operational aspects of the power machine.

In one embodiment, the present invention provides selectable pulse width modulated control of auxiliary hydraulics on the power machine. In accordance with another feature of the present invention, substantially any hydraulic function can be placed in a float or detent position. Similarly, assuming that the power machine is hydraulically capable, a plurality of functions can be placed in the float or detent position.

In accordance with another feature of the present invention, a spool lock control solenoid is provided with modulated control. This allows the spool lock to be unlocked in accordance with a power saving technique.

Another aspect of the present invention allows multiple speed control of the loader. Similarly, a transition between the low and high speed is modulated to accomplish smooth speed transitions.

The present invention also provides a number of features with respect to electric or electronically controlled outputs. For example, the state of the engine is monitored such that the starter will not be activated while the engine is running. In addition, the state of a plurality of relays is monitored for proper operation. Similarly, the electrical configuration of a number of relays is also monitored for proper control.

In accordance with another aspect of the present invention, a hydraulic fan speed is controlled based on a number of criteria. The criteria can include operating parameters of the power machine.

The present invention also provides a password hierarchy and functionality for limiting access to certain functions based on the level of a password possessed by the user. Locking and unlocking functionality is also provided to allow re-starting the power machine without re-entering a password.

Further, one embodiment of the present invention allows upgrading an operator input panel from a key-type ignition input to include a keypad input and display device. The update procedure is substantially automated and precludes downgrades without appropriate authority as evidenced by, for example, knowledge of a high level password.

BRIEF DESCRIPTION OF THE DRAWINGS

FIG. 8 is a flow diagram illustrating the operation of a control system in controlling transitions between two speeds in a multi-speed power machine.

FIG. 10 is a more detailed block diagram of a portion of the control system shown in FIG. 2.

DETAILED DESCRIPTION OF THE PREFERRED EMBODIMENTS

The present invention proceeds with respect to a loader described below. However, it should be noted that the present invention can be implemented in other power machines, such as mini-excavators, as well. The present invention is described with respect to the loader for illustrative purposes only.

Figure 1:
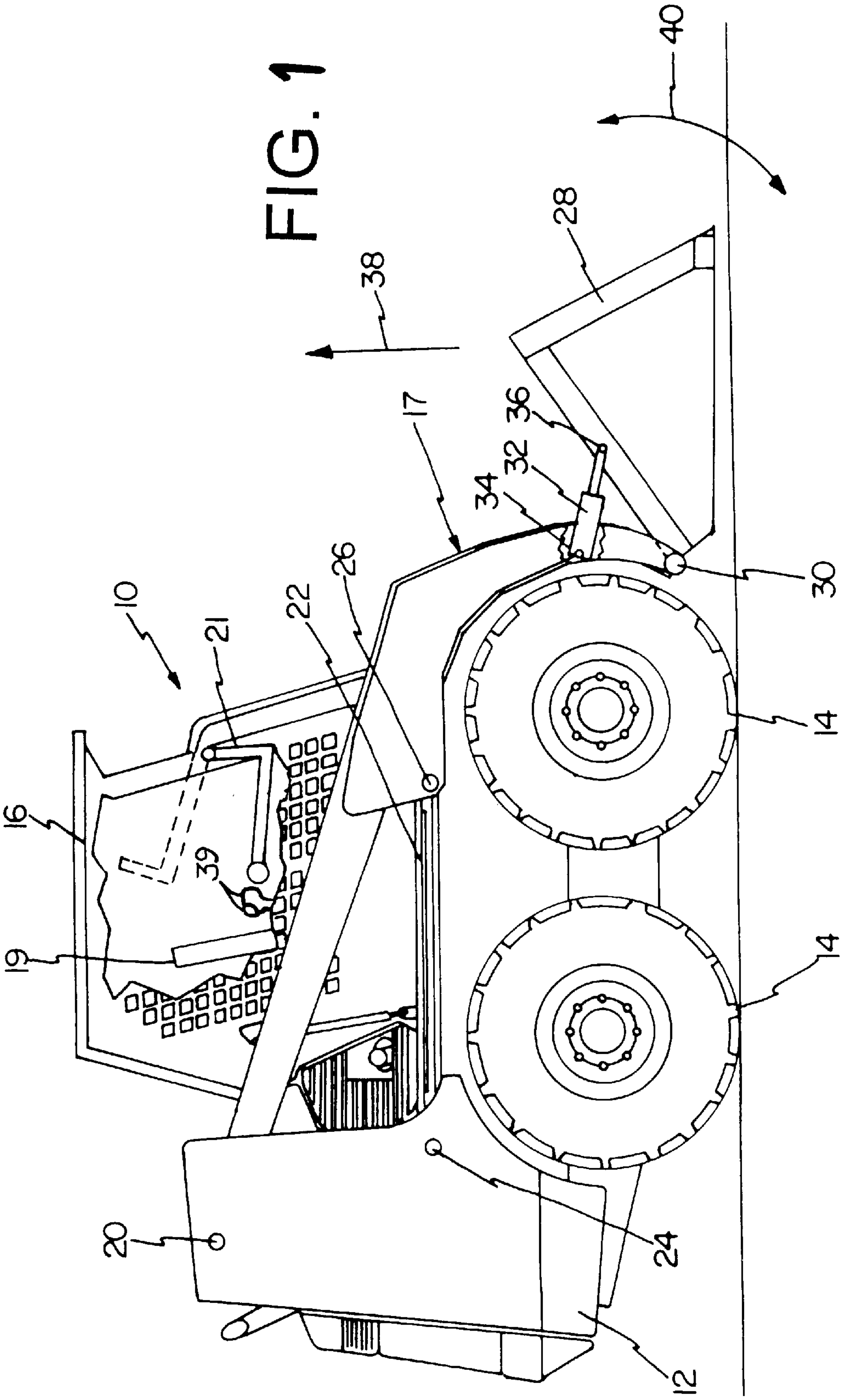
FIG. 1 is a side view of a skid steer loader in accordance with one aspect of the present invention.

FIG. 1 is a side elevational view of a skid steer loader 10 of the present invention. Skid steer loader 10 includes a frame 12 supported by wheels 14. Frame 12 also supports a cab 16 which defines an operator compartment and which substantially encloses a seat 19 on which an operator sits to control skid steer loader 10. Cab 16 can take any shape desired and is illustrated with the shape shown for illustrative purposes only. A seat bar 21 is pivotally coupled to a portion of cab 16. When the operator occupies seat 19, the operator then pivots seat bar 21 from the raised position (shown in phantom in FIG. 1) to the lowered position shown in FIG. 1. It should also be noted that seat bar 21 can be a rear pivot seat bar or can take substantially any other form.

A lift arm 17 is coupled to frame 12 at pivot points 20 (only one of which is shown in FIG. 1, the other being identically disposed on the opposite side of loader 10). A pair of hydraulic cylinders 22 (only one of which is shown in FIG. 1) are pivotally coupled to frame 12 at pivot points 24 and to lift arm 17 at pivot points 26. Lift arm 17 is also coupled to a working tool which, in this preferred embodiment, is a bucket 28. Lift arm 17 is pivotally coupled to bucket 28 at pivot points 30. In addition, another hydraulic cylinder 32 is pivotally coupled to lift arm 17 at pivot point 34 and to bucket 28 at pivot point 36. While only one cylinder 32 is shown, it is to be understood that any desired number of cylinders could be used to work bucket 28 or any other suitable tool.

The operator residing in cab 16 can manipulate lift arm 17 and bucket 28 by selectively actuating hydraulic cylinders 22 and 32. By actuating hydraulic cylinders 22 and causing hydraulic cylinders 22 to increase in length, the operator moves lift arm 17, and consequently bucket 28, generally vertically upward in the direction indicated by arrow 38. Conversely, when the operator actuates cylinder 22 causing it to decrease in length, bucket 28 moves generally vertically downward to the position shown in FIG. 1.

The operator can also manipulate bucket 28 by actuating cylinder 32. When the operator causes cylinder 32 to increase in length, bucket 28 tilts forward about pivot points 30. Conversely, when the operator causes cylinder 32 to decrease in length, bucket 28 tilts rearward about pivot points 30. The tilting is generally along an arcuate path indicated by arrow 40.

FIG. 1 also illustrates a plurality of hand controls, or hand grips 39 which reside within the operator compartment 16. Hand grips 39 preferably are provided with a number of actuators (such as push buttons, potentiometers, switches, etc.) which can be manipulated by the operator to accomplish certain functions. The operator-actuable inputs on hand grips 39 in one illustrative embodiment provide electrical signals to a control computer (described in greater detail later in the specification) which controls certain functions of loader 10 in response to the signals received.

In addition, in one illustrative embodiment, one or more operator input and display panels (shown in FIG. 2) are provided in operator compartment 16. The operator input display panels provide a display for indicating certain items of information to the operator, and also provide additional operator input devices, such as a membrane keypad, a touch sensitive screen, etc., through which the operator can provide inputs.

It should, however, be noted that inputs can be provided in a mechanical way as well. For instance, hand grips 38 can be coupled to levers which control valve spools or solenoids through mechanical linkages. Similarly, foot pedals can be provided in operator compartment 16 which also control valve spools or solenoids through mechanical linkages.

In addition, loader 10 illustratively has one or more auxiliary hydraulic couplings (not shown in FIG. 1) which can be provided with quick disconnect type fittings. Hydraulic pressure to the auxiliary couplings can also be controlled based on signals from one or more of the operator input devices within operator compartment 16.

Figure 2:
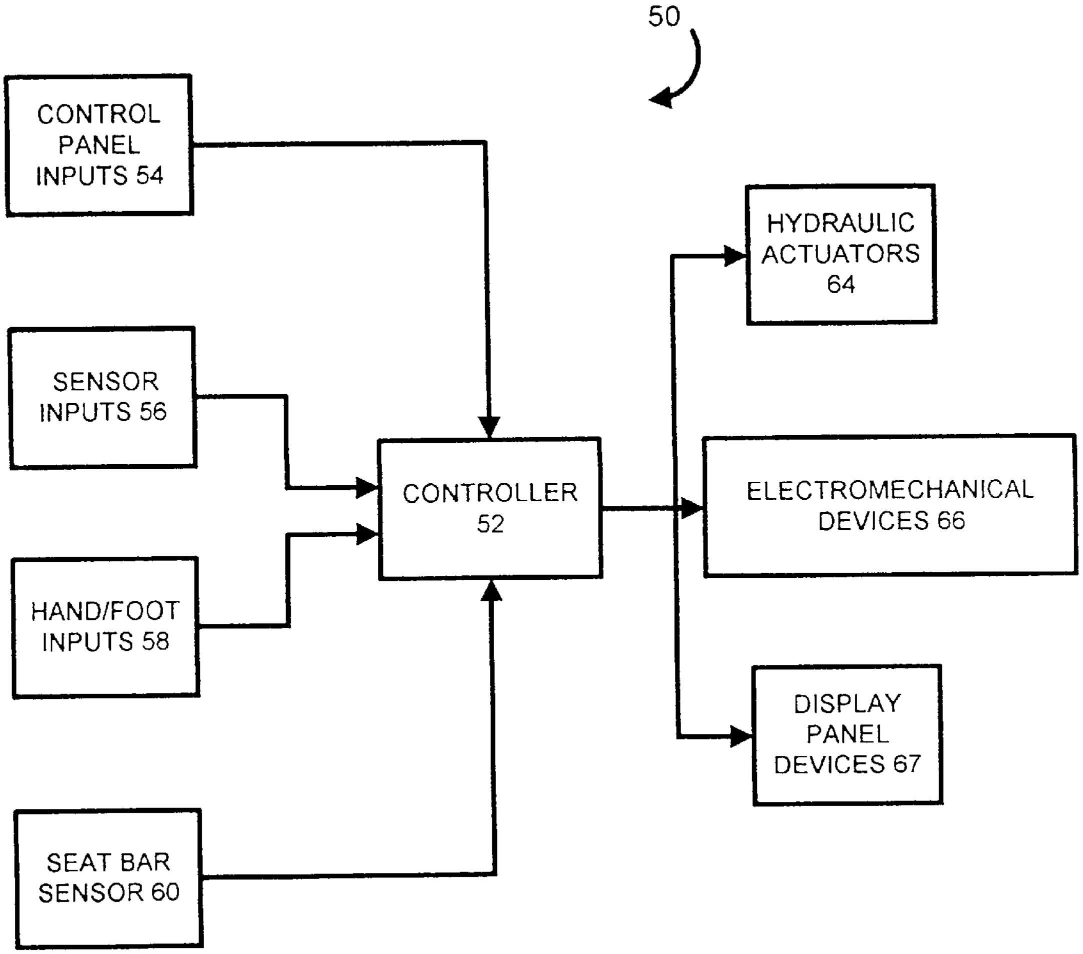
FIG. 2 is a block diagram of a control system in accordance with one aspect of the present invention.

FIG. 2 is a block diagram of one embodiment of a control system 50. System 50 includes controller 52, control panel inputs 54, sensor inputs 56, hand/foot inputs 58, sensor 60, hydraulic actuators 64, electromechanical solenoids 66, and display panel devices 67. Controller 52 is illustratively a digital computer, microprocessor, or microcontroller with associated memory which can be integrated or provided separately. Controller 52 also includes appropriate timing circuitry.

Control panel inputs 54 can include a wide variety of operator interfaces used to control such features as headlights, interlock systems, ignition, etc. This information can be transmitted to controller 52 via direct digital inputs, a one-way serial stream or any number of bi-directional serial communication protocols. Similarly, the connection between control panel inputs 54 and controller 52 illustratively includes power and ground connections as well.

Sensor inputs 56 can also include a wide variety of analog or digital sensors or frequency inputs indicative of operating conditions or other sensed items, such as engine oil pressure sensor, fuel sensor, engine cooling sensor, air filter sensor (which indicates reduced air flow—thus indicating a clogged air filter), engine speed sensor, a hydraulic oil temperature sensor, a hydraulic oil charge pressure sensor, and/or a hydraulic oil filter pressure switch, etc.

Hand grip and foot pedal inputs 58 can also include a variety of input devices which form the operator actuable inputs within operator compartment 16. Such inputs can provide signals indicative of requested operation of the auxiliary hydraulic couplers (e.g., modulated control), requested detent, requested high speed or low speed operation in a multi-speed loader, and other requested functions (such as lift and tilt of the tool mounted to the loader, etc.).

Seat bar sensor 60 is illustratively coupled to seat bar 21. Seat bar sensor 60 illustratively provides a signal indicative of whether seat bar 21 is in the raised or lowered position illustrated in FIG. 1.

Hydraulic actuators 64 illustratively include the lift and tilt cylinders for use in manipulating tool 28 (shown in FIG. 1), a high flow valve for emitting high flow hydraulic fluid in response to a user input, a diverter valve for diverting hydraulic fluid to the auxiliary couplers in response to a user input, auxiliary relief valves, and a plurality of lockout valves for being actuated in response to operator inputs, or in response to certain sensed operating parameters. Of course, the hydraulic actuators are controlled by manipulating valve spools of valves connected between the specific actuator being controlled and a source of, or reservoir for, hydraulic fluid. Such valves include one or more primary valves controlling flow to primary hydraulic couplers and optionally one or more auxiliary valves for controlling flow to auxiliary hydraulic couplers. The valves can be controlled electronically, hydraulically or mechanically. Block 64 represents all of these elements.

Electromechanical solenoids 66 also include a wide variety of items. Some items are embodied as electrical relays which are controlled by energizing an electrical relay coil. Such electromechanical devices illustratively include a starter relay for energizing a starter, a switched power relay for providing battery power for switched power devices, a fuel shut-off relay for energizing a fuel shut-off valve, a traction lock relay for energizing a traction lock solenoid, a glow plug relay for energizing glow plugs, and light relays for controlling various lights (such as headlights, marker lights, etc.).

Display panel devices 67 are illustratively devices which receive outputs from controller 52 and indicate information to the operator. Such devices can include, for example, indicator lights, an hour meter, gauges, etc. Display panel devices 67 can be integrated with control panel inputs 54 as a unitary input and display panel, or provided separately therefrom.

In operation, controller 52 receives a variety of inputs from the control panel inputs 54, the sensor inputs 56, the hand and foot actuable inputs 58, and seat bar sensor 60. In response to those inputs, controller 54 provides outputs to hydraulic actuators 64 electromechanical devices 66 and display panel devices 67 to control various functions on loader 10.

Auxiliary Hydraulics Selector

Figure 3:
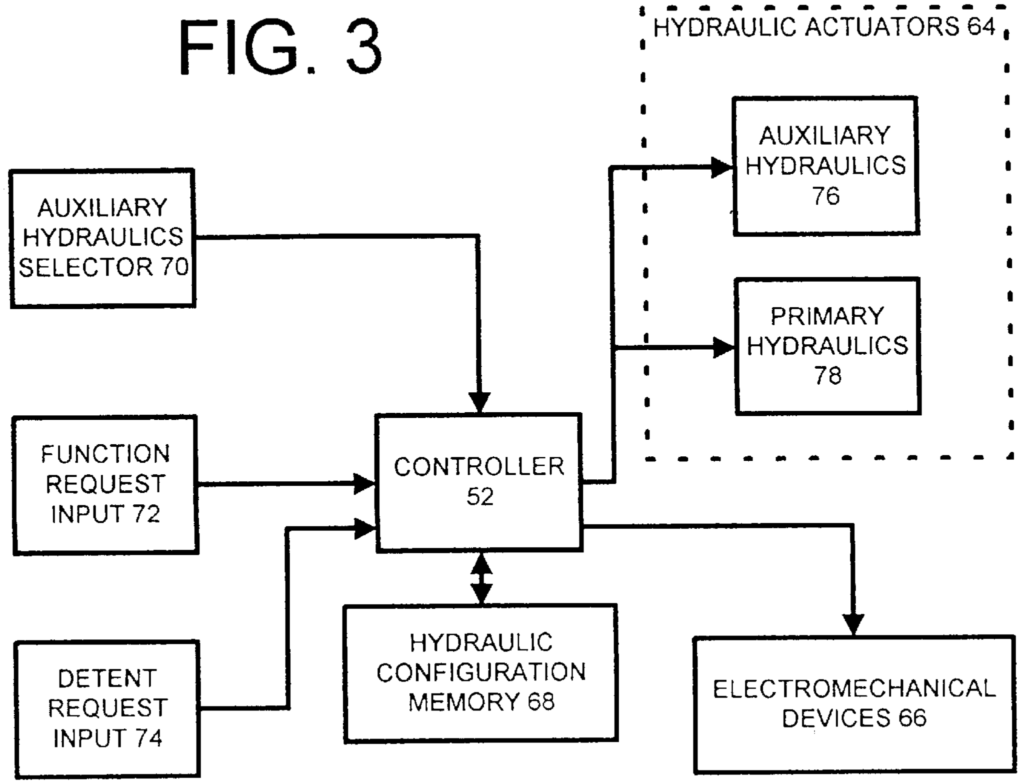
FIG. 3 is a more detailed block diagram of a portion of the control system shown in FIG. 2.

FIG. 3 is a more detailed block diagram of a portion of system 50. FIG. 3 illustrates that controller 52 is coupled to a hydraulic configuration memory 68. Again, it should be noted that memory 68 can either be integral with controller 52 or separate therefrom. For the sake of clarity, it is indicated in a separate block in FIG. 3. Controller 52 is also coupled, in the illustrative embodiment shown in FIG. 3, to auxiliary hydraulics selector 70, function request input 72, detent request input 74, auxiliary hydraulics 76, optionally primary hydraulics 78 (both of which form part of the hydraulic actuators 64 and associated valves illustrated in FIG. 2) and electromechanical devices 66.

Auxiliary hydraulics selector 70, function request input 72 and detent request input 74 can each be either a control panel input (such as a depressible keypad button) or a hand/foot input (such as an electrical or mechanical input from hand grips 39 or pedals-not shown).

In operation, controller 52 receives input signals from input devices 70, 72 and 74, and controls hydraulic actuators 64 and electromechanical devices 66 accordingly. In one illustrative embodiment, auxiliary hydraulics selector 70 is simply a push button, or depressible switch on one of hand grips 39 in operator compartment 16. While other loaders have provided modulated control of auxiliary hydraulic valves, such loaders have typically provided such control at all times, or have not made such control selectable by the operator.

By contrast, one illustrative embodiment of the present invention provides selector switch 70 which can be easily manipulated by the operator. In response to such manipulation, controller 52 controls auxiliary valves associated with hydraulics 76 in a modulated fashion. This control can be accomplished by applying an appropriate signal to an electronically controlled solenoid in the auxiliary valve, or by controlling a hydraulic pilot pressure. Therefore, rather than simply controlling the auxiliary hydraulics in an On/Off fashion, modulated flow is provided for achieving a substantially continuous variation in output hydraulic pressure provided at the auxiliary hydraulic couplers 76. In one illustrative embodiment, selector 70 is simply a toggle switch which toggles controller 52 from operating auxiliary hydraulics 76 in the modulated mode and in the On/Off mode. Of course, other input configurations can be used as well.

Duty Cycle Variation In Modulated Control

Figure 3A:
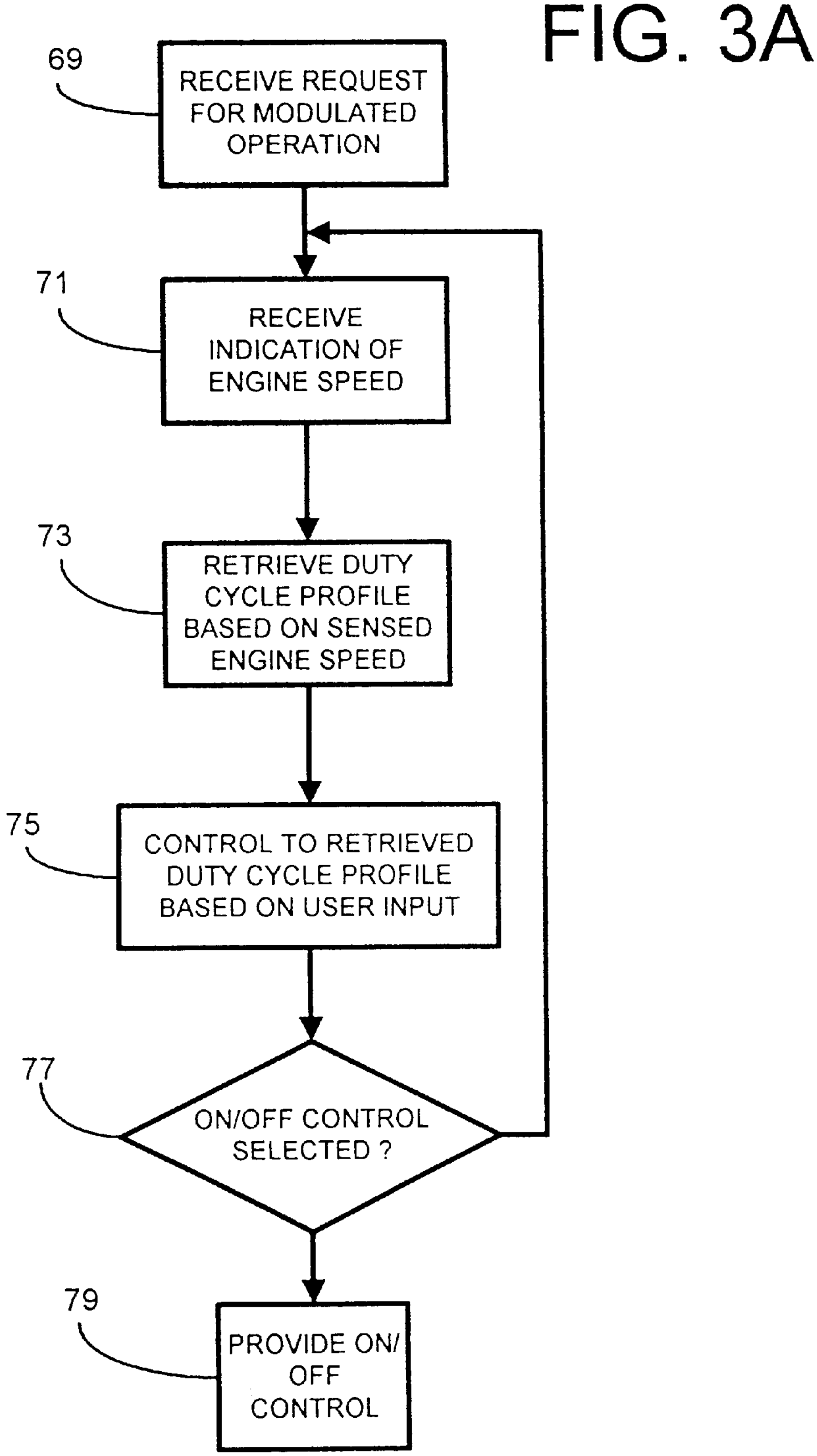
FIG. 3A is a flow diagram illustrating modulated control with variable duty cycle based on engine speed, in accordance with one aspect of the present invention.

The present invention also provides for a variable duty cycle in modulated flow. This is more fully illustrated with respect to FIG. 3A. For example, different engine speeds can result in different charge pressures. Therefore, metering to a preselected duty cycle, independent of engine speed, can provide different pressures at the same duty cycle.

Therefore, the present controller provides metered operation with duty cycle based on engine speed. First, controller 52 receives a request for modulated operation (such as through auxiliary hydraulic selector 70). This is indicated by block 69. Controller 52 then receives, from sensor inputs 56, an indication of engine speed. This is indicated by block 71. Based on the engine speed sensed, controller 52 accesses a duty cycle memory which contains a number of duty cycle profiles associated with different engine speeds. The duty cycle profiles will contain different duty cycles and rates of change to achieve desired metering, based upon the engine speed. Such profiles can be any desired profiles, for accomplishing any desired metering. Retrieving the duty cycle profile is indicated by block 73.

Controller 52 then controls the selected actuator according to the retrieved duty cycle profile and based on the operator input associated with the selected hydraulic actuator. This is indicated by block 75. Controller 52 continues to control the selected actuator in this way until the operator provides an input indicating that on/off control is desired. This is indicated by block 77. At that point, controller 52 begins controlling the selected actuator in an on/off manner. This is indicated by block 79.

Detent Request

In accordance with another illustrative aspect of the present invention, detent request input 74 is also provided as an operator actuable input on one of hand grips 39. Function request input 72 is shown to simply represent substantially any hydraulic function which can be requested.

Controller 52 is configured to control substantially any hydraulic function in a detent mode. In order to place a specific hydraulic function in detent mode, the operator can manipulate the appropriate user input device to request a hydraulic function, in combination with the activation of detent request input 74. In one illustrative embodiment, this causes the requested hydraulic function to be controlled in detent mode. Subsequent manipulation of the same user input can also cause that function (which is currently in detent mode) to be deactivated. Of course, detent can be done in any suitable manner. For example, if no detent functions are active and the operator depresses the detent request input 74, the front female hydraulic connector is placed in the detent mode. If any other hydraulic functions are already in detent mode, then pressing detent request input 74 alone de-activates all detented functions. Similarly, if any hydraulic functions are in detent mode, then pressing detent request input 74 in combination with any hydraulic function which is not capable of being placed in detent mode de-activates all detented functions.

In addition, if any hydraulic functions are in detent mode, pressing an operator input which requires the same hydraulic flow as the detented function, and does not require any electrical outputs from controller 52, has no effect. If any hydraulic functions are in detent mode, pressing a user input which requires the same flow as the detented function and which also requires an electrical output, causes energization of those electrical outputs (and causes the hydraulic flow to be maintained). When the held switch is released, the previously detented functions remain engaged.

In one preferred embodiment, a certain hydraulic function can be in detent mode, and the operator may provide another input which requests conflicting flow. This can be handled in a number of different ways. For example, in one illustrative embodiment, the latter requested hydraulic function takes precedence. However, when the latter requested function is no longer requested by the operator, controller 52 "remembers" the previously detented function and again places that function in detent mode.

In another illustrative embodiment, once the operator requests a hydraulic function which requires flow that conflicts with a detented function, the function in detent mode is deactivated due to the flow conflict, and is not remembered once the latter requested function is no longer requested by the operator. In yet another illustrative embodiment, when a function is in detent mode and the operator requests a subsequent function which requires a flow conflict, the detented function takes precedence until the operator deactivates the detent mode. Any of these embodiments, or a combination of embodiments for certain hydraulic functions, can be implemented on loader 10.

In addition, if a hydraulic function is in detent mode, and the operator requests a subsequent hydraulic function which introduces no hydraulic fluid flow conflict, both functions are illustratively allowed to operate simultaneously. Alternatively, the latter requested function can cause the detented function to become deactivated.

In this way, substantially any function can be placed in the detent mode. Also, a plurality of functions can be placed in detent mode simultaneously.

For different models of loaders (or combinations of functions), it may be impossible to place certain functions in detent mode, because they are not hydraulically plumbed in a suitable manner. Therefore, in one illustrative embodiment, controller 52 includes hydraulic configuration memory 68 which contains, for example, a look-up table which lists functions which may be placed in detent mode for each of a variety of loaders. The loaders can optionally be identified by model number, serial number, or any other suitable identification information which is indicative of the type of hydraulic plumbing included on the loader. When the operator requests that a ceratin function be placed in detent mode, controller 52 (which can be programmed with its own identification information) accesses hydraulic configuration memory 68 and, if possible, controls the requested function in detent mode.

Relay Diagnostics

Figure 4:
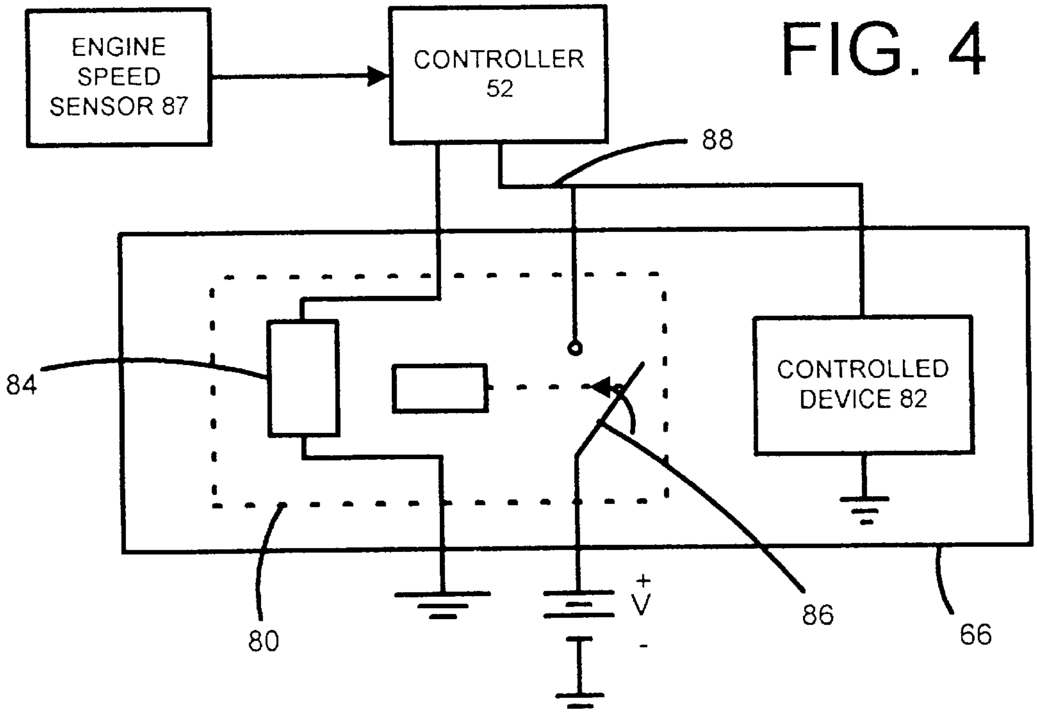
FIG. 4 is a more detailed block diagram of a relay which can form a part of the control system shown in FIG. 2.

FIG. 4 is a more detailed block diagram of another portion of control system 50. FIG. 4 illustrates one of electromechanical devices 66 in more detail. FIG. 4 illustrates that devices 66 can include relays, such as relay 80, a controlled device illustrated by block 82, and engine speed sensor 87. Relay 80 includes an energizable coil 84 and a set of contacts 86. Controller 52 provides an output to coil 84. When coil 84 is energized, it causes contacts 86 to change positions from that shown in FIG. 4. Thus, for example, when controller 52 wishes to apply power to controlled device 82, controller 52 energizes coil 84, causing contacts 86 to close, thereby applying voltage to controlled device 82. Controlled device 82 can be any of a number of electronic devices such as those described above, including glow plugs, a traction lock pull coil, a fuel shut-off valve pull coil, the starter, etc.

A number of the features illustrated in FIG. 4 are worth noting. First, the output end of contacts 86, which are coupled to controlled device 82, are also coupled back through an input conductor 88, to controller 52. In this way, controller 52 can monitor the state of contacts 86. This provides a diagnostic tool for controller 52. In other words, if controller 52 has de-energized the relay 84 associated with the fuel shut-off valve, controller 52 can check to ensure that the contacts associated with the fuel shut-off valve have opened. If they have not, controller 52 will sense a high (or other suitable logic level) indicative of the fact that contacts are in an improper state. Similarly, controller 52 can determine whether the contacts 86 are stuck in an open position. In other words, if controller 52 energizes coil 84, but does not receive the appropriate signal on conductor 88, controller 52 can determine that the contacts are stuck open. Such feedback can be provided on any desired relays.

Other Tasks

The present invention can also perform a number of other desirable tasks. For example, controller 52 can be configured to sense whether the engine is running. This can be done in any number of ways. For instance, and as illustrated in FIG. 4, controller 52 can simply check an input from one of the sensor inputs 56, such as engine speed sensor 87. If the engine speed sensor 87 is providing an indication of engine speed, controller 52 can determine that the engine is running.

In that case, controller 52 can avoid taking certain actions. For example, since the starter is illustratively provided as a controlled device 82, its energization signal is not provided directly from a keyswitch or other starter switch. Instead, the keyswitch or other starter switch provides an input to controller 52 which, in turn, provides the energization signal to relay 80 which closes its contacts to provide energization to the starter (embodied as one of controlled devices 82). Therefore, each time controller 52 receives a starter or ignition signal, controller 52 can monitor the engine speed sensor 87 to determine whether the engine is already running. If so, controller 52 can be configured to simply ignore the ignition or starter signal from the key or start switch, in order to avoid grinding the starter while the engine is running. Of course, rather than sensing engine speed, controller 52 can be configured to sense a wide variety of other things, including engine oil pressure, etc., to determine whether the engine is running.

Spool Lock Control

Figure 5:
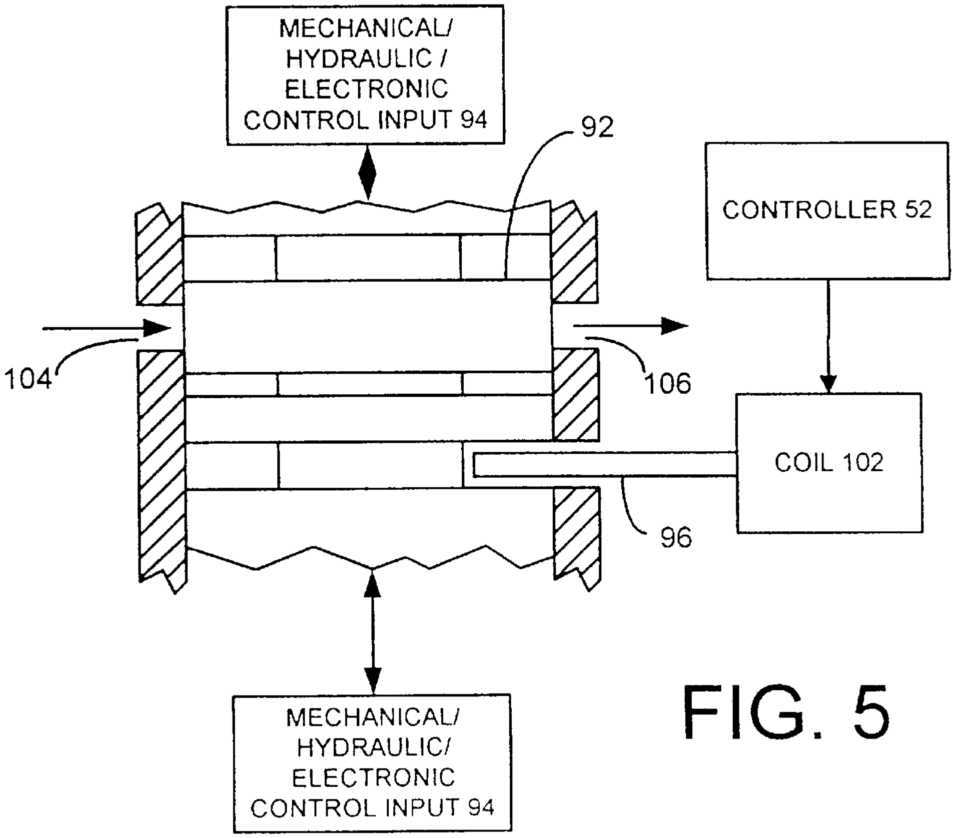
FIG. 5 is a more detailed block diagram of a spool lock system in accordance with one aspect of the present invention.

FIG. 5 is a more detailed block diagram of another portion of control system 50 illustrated in FIG. 2. FIG. 5 illustrates controller 52, coupled to a hydraulic valve 90 which includes reciprocal valve spool 92, a mechanical, electrical or hydraulic control input device 94, a spool lock pin 96, and a pull and hold coil 102. In the embodiment illustrated in FIG. 5, valve 90 has an inlet 104 and an outlet 106. Hydraulic fluid under pressure (or any other fluid) is provided at inlet 104 and, when spool 92 is in the actuated position (opposite that shown in FIG. 5) hydraulic fluid under pressure (or another fluid) is allowed to pass from inlet 104 through to outlet 106. Spool 92 can be moved within valve 90 through an electrical or mechanical linkage or a hydraulic pilot pressure, any of which can be controlled by any suitable input device.

Locking pin 96 is spring biased inwardly, into the locking position shown in FIG. 5. In that position, spool 92 cannot be reciprocally moved to the actuated position. However, when it is desired to actuate spool 92, controller 52 provides a signal to pull and hold coil 102. The signal is on steadily for a first period of time and is modulated thereafter. For example, the signal initially energizes coil 102 steadily for 200 ms and then modulates the signal at a desired duty cycle, such as 25 percent for example. This initially exerts a relatively high degree of pull force on locking pin 96 causing locking pin 96 to reciprocate outwardly, out of engagement with spool 92. Since locking pin 96 has already been withdrawn based on the relatively strong pulling force exerted by coil 102, controller 52 can then provide the relatively low current modulated energization of hold coil 102 to simply hold locking pin 96 against the spring biased force in the retracted position. This allows spool 92 to be moved (e.g., downwardly in FIG. 5) to an actuated position which provides for fluid flow between inlet 104 and outlet 106.

This substantially alleviates a problem which can arise with this arrangement. For example, when the operator provides an input which exerts actuation pressure on spool 92, a side load is imparted on locking pin 96. This can make it very difficult to withdraw pin 96 with low current energization of coil 102 until after the load on spool 92 has been removed. This problem can be accommodated in a number of different ways. For example, coil 102 could be continuously energized in a high current fashion to ensure withdrawal of pin 96 regardless of a side load. However, this can take an undesirably large amount of current, and can require a larger coil in order to dissipate heat or power, without burning out the coil.

In accordance with one aspect of the present invention, controller 52 is configured to provide a modulated output to coil 102. In one illustrative embodiment, controller 52 periodically applies a retraction signal to coil 102 and then a hold signal. For instance, once the operator input is received to retract locking pin 96, controller 52 provides a periodic output to coil 102 to continuously energize coil 102 for an initial period (e.g., 200 milliseconds of every second, if the signal is periodic on one second) such that pin 96 can be pulled into the retracted position. Coil 102 is only intermittently energized for the remainder of the period (e.g., to a specified duty cycle for the remainder of each second).

In this way, coil 102 will be initially energized once per second (or another desired period) with enough energy to retract locking pin 96. Coil 102 is then intermittently energized for the remainder of the period to hold pin 96 in the retracted position. Once the side load is removed, pin 96 will be retracted during the next subsequent period during the 200 ms continuous energization. Retraction of pin 96 is thus accomplished without the large energy or solenoid required to simply continuously energize coil 102 in a high current manner.

Monitor Relay Configuration

Figure 6:
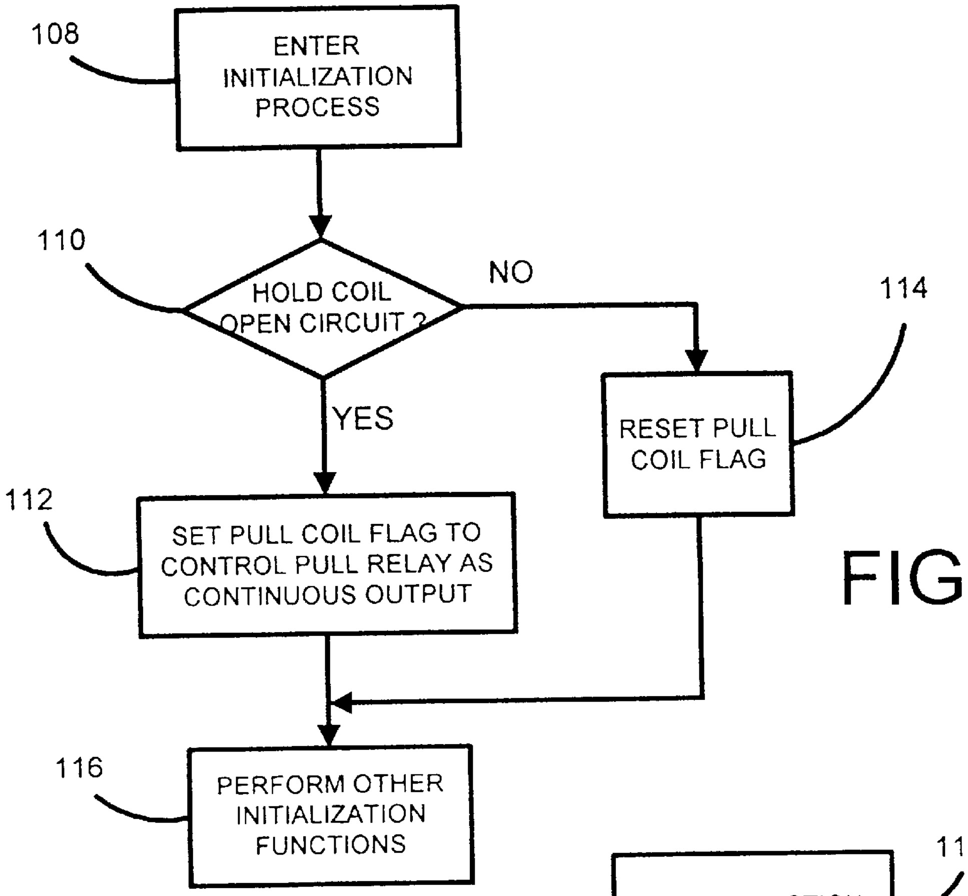
FIGS. 6 and 7 are flow diagrams illustrating operation in monitoring a relay configuration in accordance with one aspect of the present invention.

In some loaders, a number of retractable pins or other devices are provided with two separate coils (e.g., a pull coil and a hold coil). One such configuration is a traction lock device disclosed in U.S. Pat. No. 5,551,523. However, in other loaders, the same devices are provided with only a single continuous actuation coil which is used to both pull and hold the device in its energized position. Therefore, in accordance with one aspect of the present invention, the particular electromechanical configuration of the loader is sensed upon initialization. This is better illustrated by the flow diagram set out in FIG. 6.

Figure 5A:
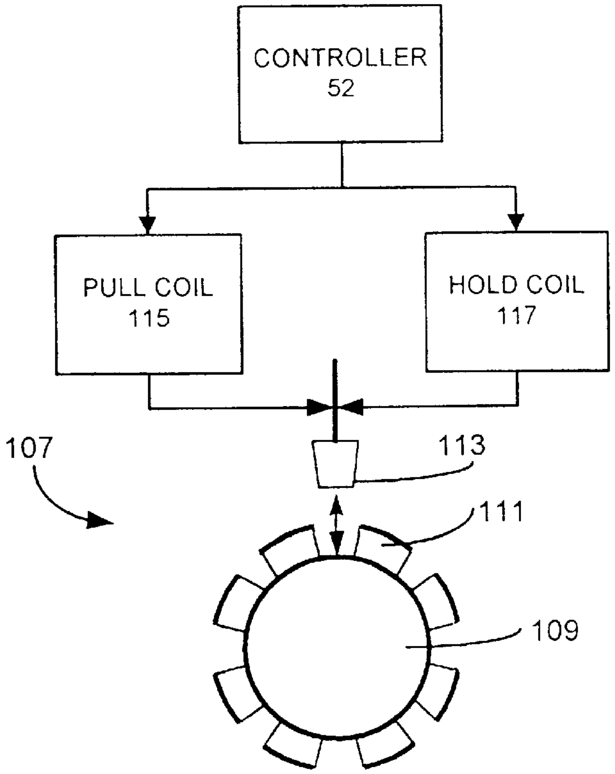
FIG. 5A illustrates one embodiment of a traction lock apparatus.

Briefly, FIG. 5A illustrates a traction lock device 107 in accordance with one aspect of the present invention. Traction lock device 107 includes a disc 109 with a plurality of spaced protrusions 111 extending therefrom. A lug 113 is electromechanically controlled by a solenoid which is manipulated through energization of a pull coil 115 and a hold coil 117. Coils 115 and 117 are connected to controller 52 either directly, or through a relay. When the operator desires to lock traction of loader 10, the operator provides an input to controller 52 de-energizing coils 115 and 117 and allowing lug 113 to drop into one of the spaces between protrusions 111 on disc 109. Since disc 109 is connected to the wheels, or to an axle, this precludes the wheels from rotating, therefore locking traction on loader 10. In order to retract lug 113, controller 52 first energizes pull coil 115, such as through a relay. Pull coil 115 is a relatively high current pull coil which exerts a relatively high displacement force on lug 113 enabling lug 113 to be withdrawn from the aperture within which it is residing, even under some side load forces. Controller 52 then de-energizes pull coil 115 and energizes hold coil 117. Hold coil 117 is illustratively a lower current coil which can be continuously energized, or intermittently energized, to hold lug 113 in retracted position.

In one illustrative embodiment, if an electromechanical device is provided with only one coil, the hold coil is open circuited, while the energization input for the pull coil is connected to the controller. Therefore, in order to control such a device, the controller first enters the initialization process (such as upon power-up of loader 10). This is indicated by block 108 in FIG. 6. Next, during initialization, controller 52 determines whether the hold coil for such electromechanical devices is open circuited. This is indicated by block 110. If so, controller 52 sets a pull coil flag in its configuration memory to ensure that it controls the pull relay as a continuous output. This is indicated by block 112.

However, where the hold coil is not open circuited, but is instead connected to an actual coil, the pull coil flag is reset, as indicated by block 114. This value is also placed in the configuration memory of controller 52 such that controller 52 controls the operation of the pull coil accordingly. Controller 52 then performs other initialization functions, as indicated by block 116.

Figure 7:
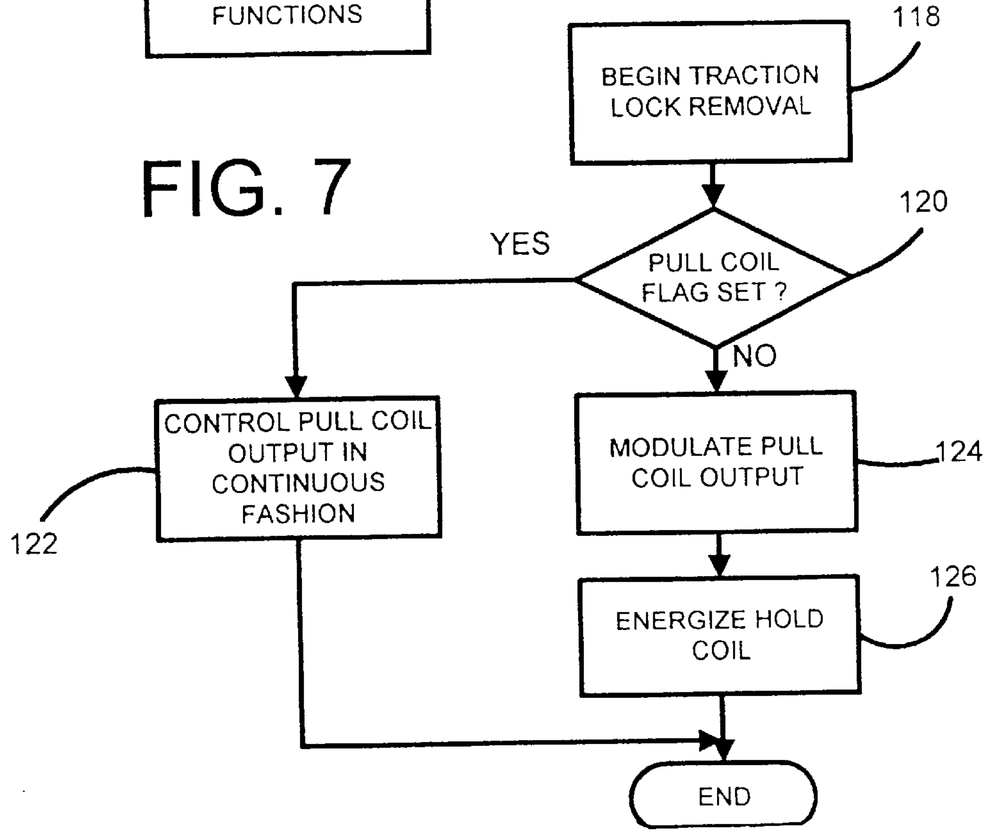

In controlling the pull and hold coils, controller 52 executes the functions indicated by the flow diagram in FIG. 7. First, controller 52 receives a signal indicating that it should begin the relay energization process (such as removal of the traction locking lug 113). This is indicated by block 118. Next, controller 52 determines whether the pull coil flag associated with that particular locking lug has been set. This is indicated by block 120. If so, controller 52 controls the pull coil energization output in a continuous fashion, because the flag indicates that only a single coil is used to control manipulation of the locking lug. This is indicated by block 122.

If, however, at block 120, it is determined that the pull coil flag is reset, then controller 52 controls the pull coil in a modulated fashion, as discussed above, in order to only retract the locking lug. This is indicated by block 124. Once locking lug 113 has been retracted, controller 52 energizes the hold coil, as indicated by block 126, and de-energizes the pull coil.

Modulation of Transition Between Speeds

Figure 9B:
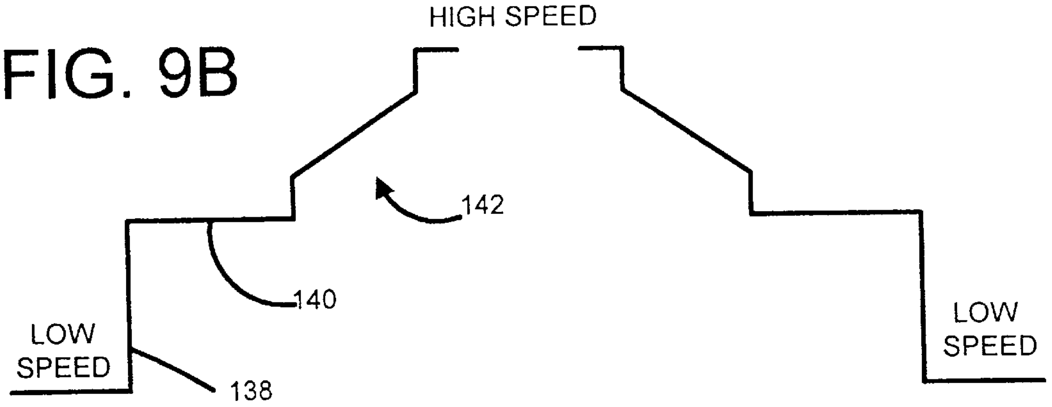
FIGS. 9A–9D are illustrative speed transition profiles.
Figure 9C:
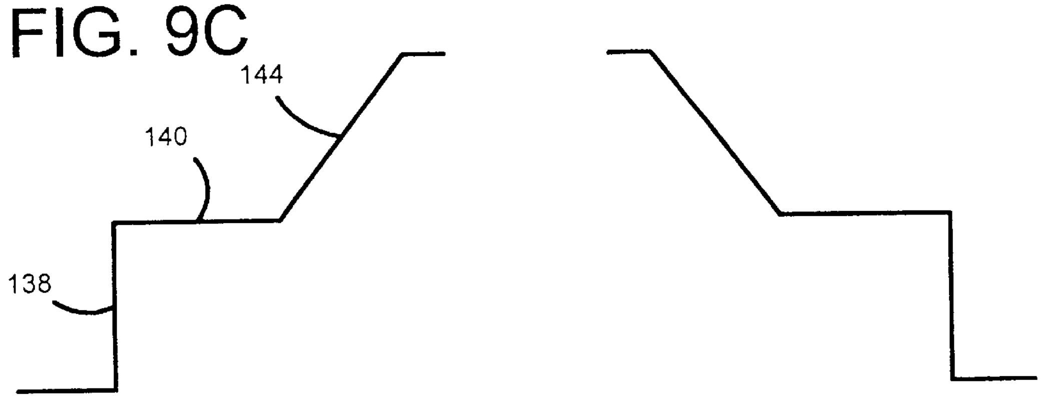
Figure 9D:
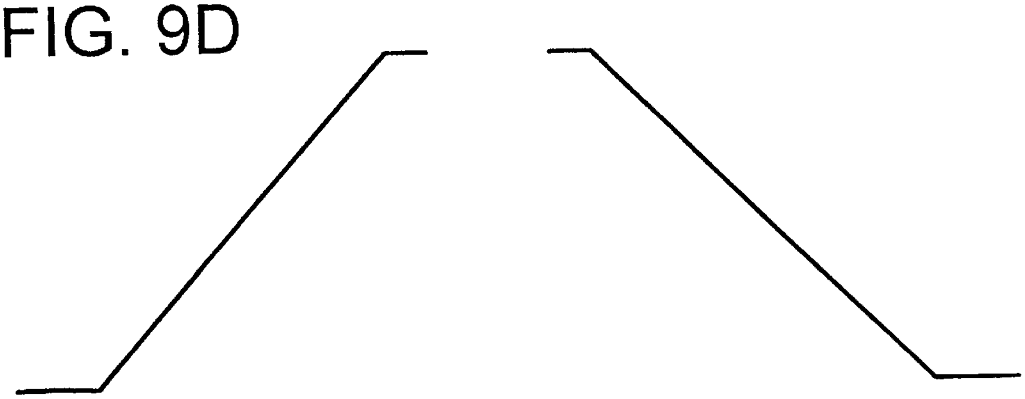
Figure 9A:
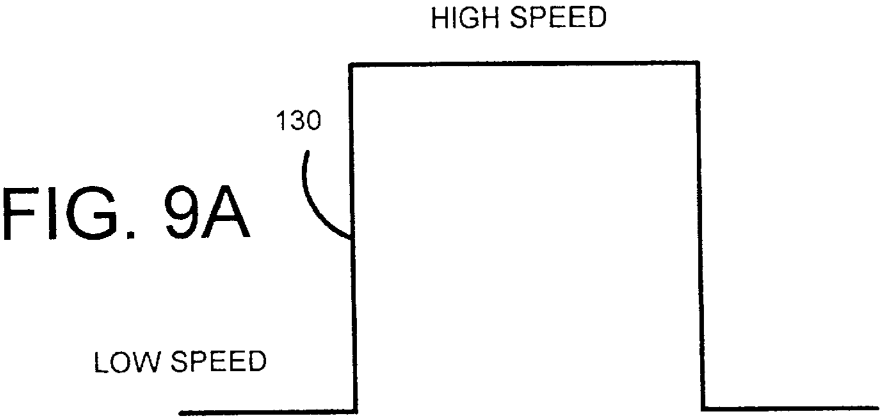

Some loaders are provided with a user actuable input for causing the loader to be operated in a selected one of two or more speeds. For example, if loader 10 has been rented to a novice user, the rental dealer may wish to set the speed to a lower speed. Similarly, where a user has a sensitive tool attached thereto, such as a forklift, and the user is approaching a pallet, the user may wish to switch the operation of the loader 10 into a slower, less responsive mode, which allows for more fine positioning. By contrast, when a user is simply driving down a road, the user may wish to control loader 10 in a higher speed mode. Therefore, some loaders have been provided with a selector which can be manipulated to select between a low speed and a high speed mode. FIG. 9A is a transition profile in accordance with the prior art. In FIG. 9A, the loader is originally operating in a low speed until an event 130 is received, such as actuation of the two speed indicator by the operator. In such prior art loaders, this was controlled hydraulically and hydraulic flow immediately jumped to high speed operation, as indicated by the vertical line 130 in FIG. 9A. The same was true for transitioning from high speed to low speed operation.

FIG. 8 is a flow diagram illustrating transitioning between a low speed and a high speed in accordance with one aspect of the present invention. FIGS. 9B–9D illustrate a less abrupt, and more modulated, transition between low speed and high speed implemented by the technique shown in FIG. 8.

First, controller 52 receives the two-speed high selection input from the operator. This is indicated by block 132. Next, controller 52 retrieves a modulation profile from system memory. For instance, certain profiles can be used with different machine models, or under different operating conditions. In one example, controller 52 may wish to use a different modulation profile depending on the particular level of charge contained on the battery in loader 10. Any other operating conditions can be used for choosing a modulation profile as well. In any case, controller 52 accesses the appropriate modulation profile, as indicated by block 134.

Controller 52 then modulates spool position from a closed or low position to a wide open or high position based on the retrieved modulation profile. This is indicated by block 136.

FIGS. 9B–D illustrate a plurality of modulation profiles between low and high speed. In the embodiments illustrated in FIGS. 9B and 9C, the transition between the low and high speeds starts with an abrupt increase in operational speed. This provides the user with an immediate feeling of increased speed. However, the profiles indicated in FIGS. 9B and 9C then include a short plateau section 140. The profile indicated in FIG. 9B then moves through the remainder of the transition from low speed to high speed through a stepped and ramped profile 142, while the profile illustrated in FIG. 9C moves through a strictly ramped stage 144. The two profiles illustrated in FIGS. 9B and 9C transition from the high speed to the low speed according to a profile which is a mirror image of the transition from the low speed to the high speed. Of course, the two profiles can be different as well.

FIG. 9D illustrates yet another transition profile which is simply a ramped profile from low speed to high speed and from high speed to low speed. Any suitable profile can be used.

In any case, and referring again to FIG. 8, once the transition is completed from the low speed to the high speed, controller 52 simply waits to receive another operator input indicative of a desire to transition from high speed to low speed. This is indicated by block 146. As soon as that operator input is received, controller 52 modulates spool position to the closed or low position based on the particular modulation profile being used. This is indicated by block 148. In this way, transitions from low to high speed, and high to low speed, can be accomplished as generally smooth transitions, while still maintaining an operator perception of an almost immediate response.

Multiple Speed Hydraulic Fan Control

FIG. 10 is a more detailed block diagram of another portion of control system 50 shown in FIG. 2. FIG. 10 illustrates controller 52 coupled to a plurality of sensor inputs 56, such as hydraulic oil temperature sensor 150, engine coolant temperature sensor 152, and air conditioning status sensor 154. Controller 52 is also coupled to a multiple speed hydraulic cooling fan 156, which can be one of the electrical devices, or it can be coupled to one of the hydraulic actuators described above.

Hydraulic oil temperature sensor 150 and engine coolant temperature sensor 152 can be any suitable temperature sensors, such as thermocouples. Similarly, air conditioner status sensor 154 can simply be coupled to the air conditioning operator input switch to provide a signal indicative of whether the air conditioner is turned on.

It may be desirable for controller 52 to control the speed of multiple speed hydraulic cooling fan 156 based on a number of operating conditions. For example, the lowest reasonable speed may be desirable to reduce noise and conserve power. However, it may also be desirable to control fan speed depending on the temperature of the hydraulic oil and engine coolant, and the status of the air conditioner, for example.

Figure 11:
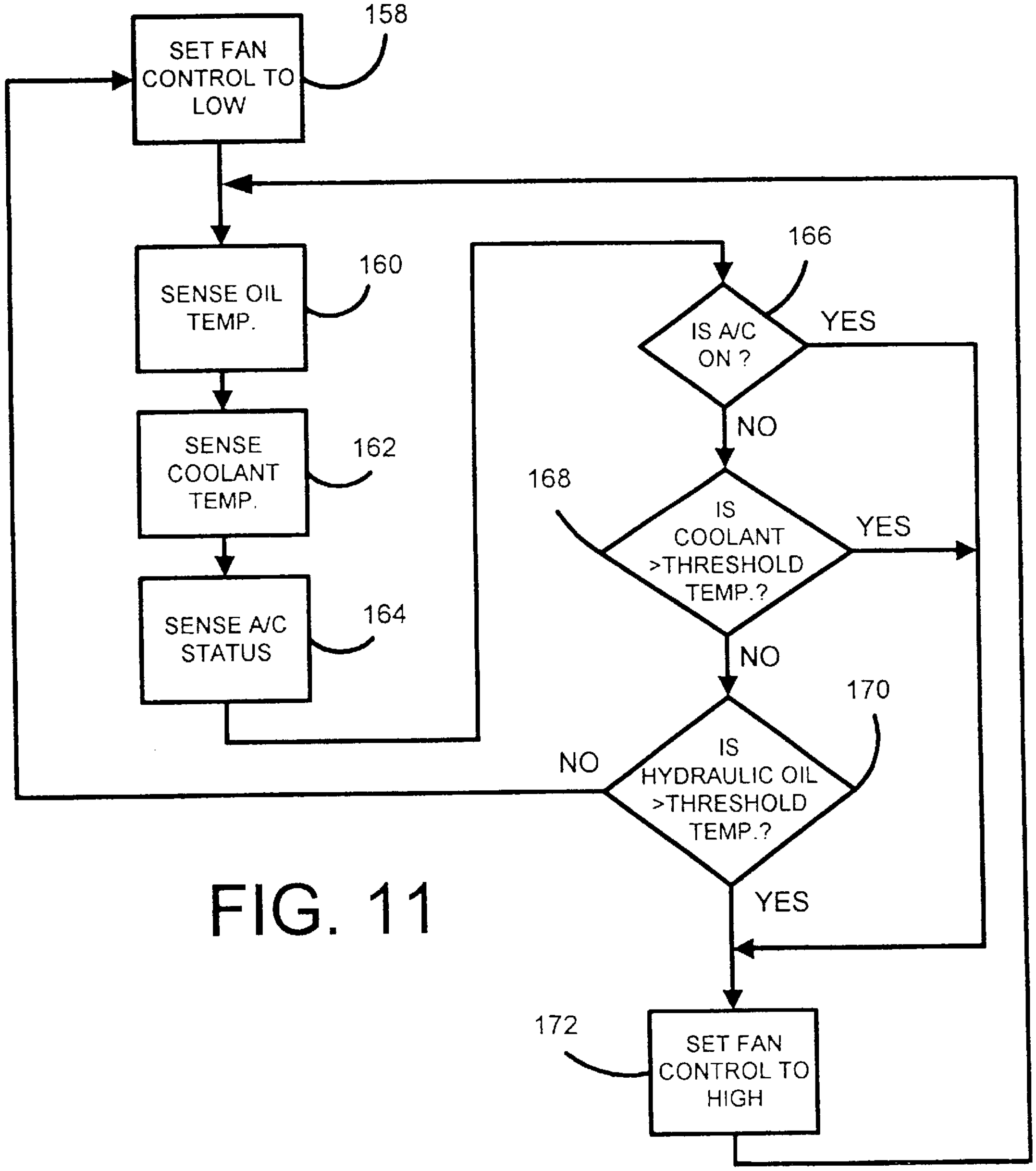
FIG. 11 is a flow diagram illustrating the operation of the portion of the control system shown in FIG. 10 in order to control fan speed.

FIG. 11 is a flow diagram illustrating the operation of controller 52 in controlling the speed of multiple speed hydraulic cooling fan 156. First, controller 52 defaults to setting the speed of fan 156 to its lowest speed. This is indicated by block 158. Controller 52 in accordance with one illustrative embodiment, then senses oil temperature, coolant temperature, and the status of the air conditioner. This is indicated by blocks 160, 162 and 164. If the air conditioner is turned on, controller 52 switches fan 156 to its high speed. This is indicated by blocks 166 and 172.

However, if the air conditioner is off, controller 52 then determines whether the coolant is below a threshold temperature. This is indicated by block 168. If not, controller 52 again sets the speed of fan 156 to its high speed setting. However, if both the air conditioner is off and the engine coolant is below the threshold temperature, then controller 52 determines whether the hydraulic oil is below a threshold temperature. This is indicated by block 170. If not, the fan is set to its high speed setting. If so, however, this indicates that the air conditioner is off, the engine coolant is below a threshold temperature and the hydraulic oil is below a threshold temperature. Therefore, controller 52 maintains the speed of fan 156 at its low speed setting. This is indicated by block 158.

As discussed above, any other suitable operating conditions can be sensed and used in setting the speed of the hydraulic cooling fan as well. Similarly, a hysteresis can be built in such that the fan is not continually switched on and off too quickly. In that case, rather than simply sensing whether the coolant is above or below a threshold temperature, controller 52 senses whether the coolant is above the threshold temperature by a given amount before the fan is turned to its high setting again. The same can be accomplished with the hydraulic oil temperature as well.

Password Features

In accordance with another embodiment of the present invention, controller 52 implements a number of password features. In one embodiment, when the password protection is enabled, proper passwords must be entered to start the engine as well as enabling other loader features, such as traction drive and hydraulic lift and tilt cylinders. In accordance with one embodiment, controller 52 implements multiple levels of passwords. For example, controller 52 assigns certain functionality to three different levels of passwords (referred to herein as the master password, the owner password, and the user password). The functionality provided to the user is dependent upon the level of password possessed by the user.

For example, in one embodiment, if the operator only possesses the user password, the operator can merely power up the machine, and operate it, without changing any selectable parameters. Similarly, if the operator possesses the owner passcode, the operator may be provided with enhanced functionality, such as changing user passwords, and changing certain selectable parameters. Further, if the operator possesses the master password (which may typically be possessed only by the manufacturer), the operator can change and delete owner passwords, and be provided with even further enhanced functionality in terms of programming and selecting selectable parameters.

As one example, if the operator possesses only the user password, the operator may be able to enter that password to power up the machine, and to operate the machine. However, if the operator possesses the owner password, the operator may be able to lock or unlock certain features which can be utilized by those who possess only the user password. For instance, if the operator possesses the owner password, the operator may be able to lock or unlock the high flow or two speed features discussed above. In that case, if the person who possesses the owner password is a rental facility, for example, that person may lock or unlock these features based on whether the renter is a novice or experienced user. Similarly, if the person possessing the owner password is a contractor, who has a plurality of employees which may be using the power machine, that contractor may provide a separate password for each different user. The contractor can change or delete such passwords, upon entry of the owner password.

Figure 12:
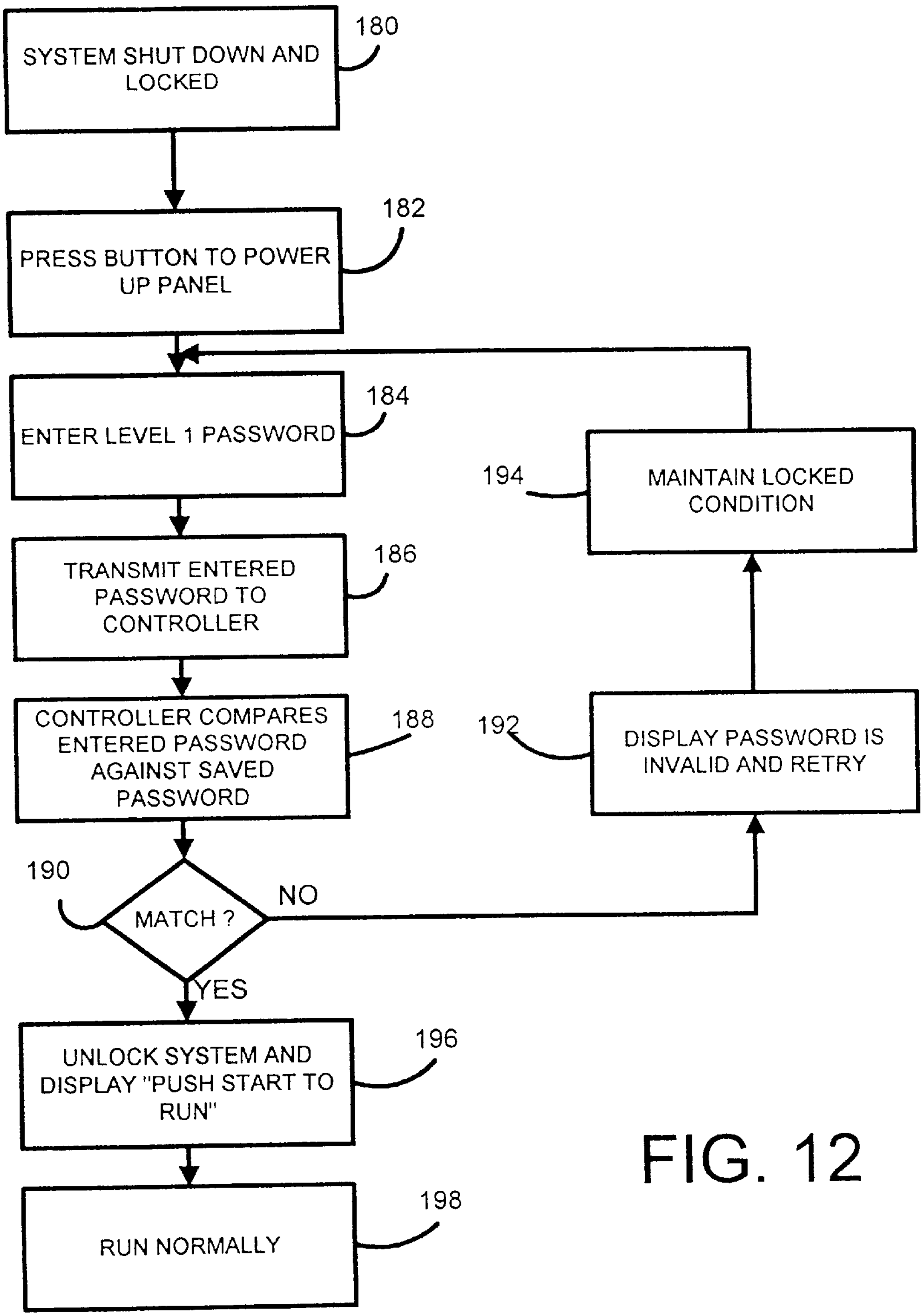
FIGS. 12–15 are flow diagrams illustrating the implementation of password functionality in accordance with various embodiments of the present invention.

FIG. 12 is a flow diagram illustrating the operation of system 50 in implementing the user password. At the outset, it should be noted that the user passwords can be entered through control panel inputs 54, which may include a keypad, a depressible membrane, a touch screen, etc.

At the beginning of FIG. 12, it is assumed that loader 10 is shut down. This is indicated by block 180. The user then illustratively presses any button on control panel inputs 54, which acts to "awaken" the control panel and controller 52. This is indicated by block 182. In an illustrative embodiment, controller 52 provides an output to display panel devices 67 prompting the user to input the level one password (e.g., the user password). This is indicated by block 184. The user then keys in the level one password and hits an Enter key, or similar key, on control panel inputs 54.

In one illustrative embodiment, control panel inputs 54 are supported by a separate microprocessor, separate from controller 52. In that embodiment, the microprocessor in control panel inputs 54 receives the Enter command and transmits the level one password to controller 52 through a serial link, a parallel link, or any other suitable communications link. This is indicated by block 186. Controller 52 then accesses a password memory associated therewith. Again, the memory can either be integral with controller 52 or discrete from controller 52. Controller 52 retrieves the level one passwords in the password memory and compares the entered password against the saved passwords. This is indicated by block 188.

If the entered password does not match any of the passwords saved in the password memory, controller 52 provides a signal to display panel devices 67 displaying, for view by the operator, a message indicating that the password entry was invalid. Controller 52 then maintains loader 10 in the locked configuration, in which hydraulic actuators and electromechanical devices cannot be activated by the user. This is indicated by blocks 190, 192, and 194.

However, if, in block 190, controller 52 determines that the password input by the user matches one of the passwords in the password memory, controller 52 provides a signal to display panel devices 67 which display, for view by the operator, a message indicating that the system is unlocked and that the user need simply press a designated button on control panel inputs 54 to start the loader. This is indicated by block 196. Controller 52, in response to the match, also provides a signal to any interlock systems implemented on loader 10 causing those systems to unlock appropriate functions (such as the traction and hydraulic functions). Controller 52 then simply controls loader 10 in a normal fashion. This is indicated by block 198.

It can thus be seen from FIG. 12 that one of the password features implemented by controller 52 is to allow a user to operate loader 10 in the normal manner, possessing only the level one password. Controller 52 not only allows ignition of loader 10, based upon entry of the proper password, but also permits certain functionality, such as by unlocking any interlock systems on loader 10.

Figure 13:
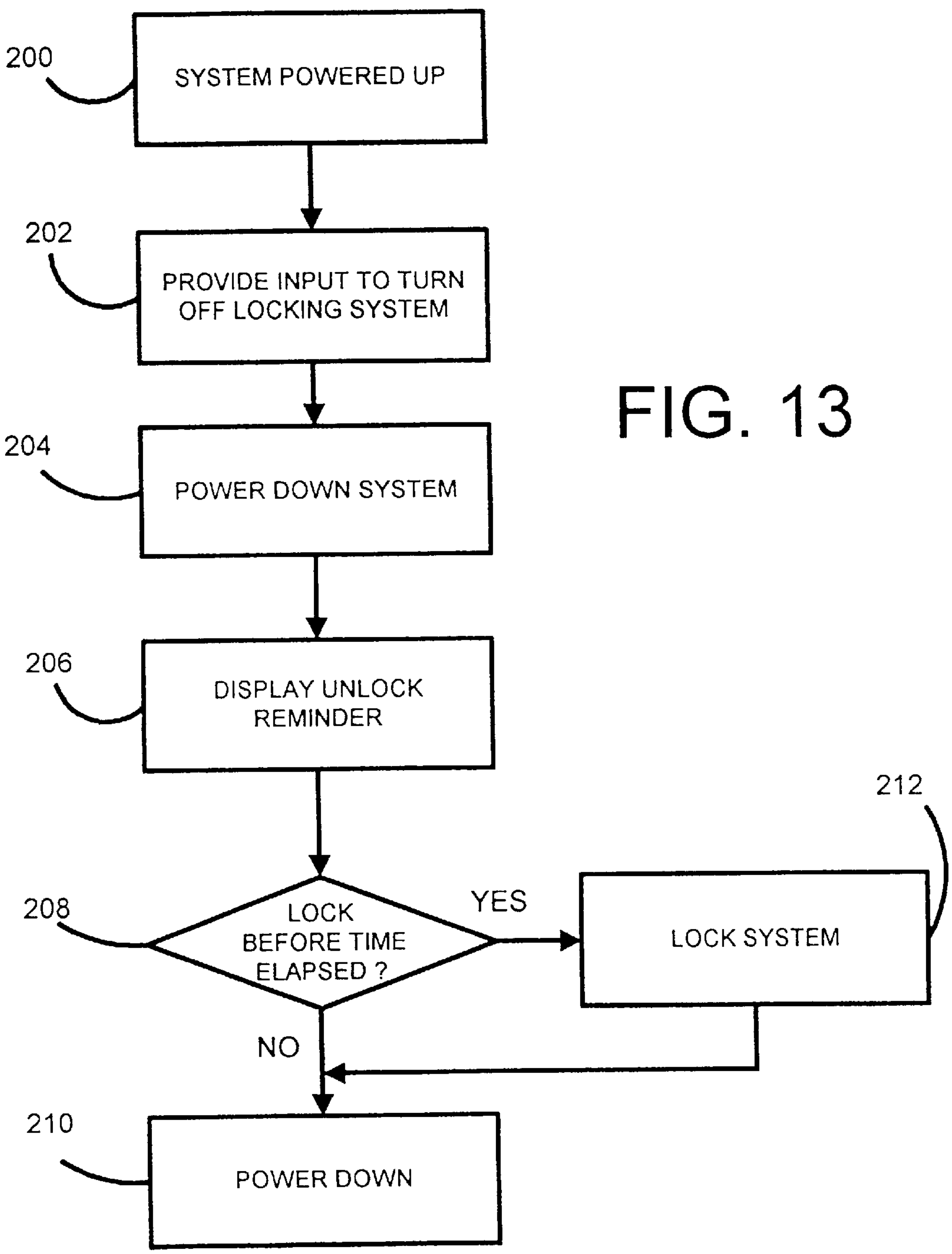

FIG. 13 is a flow diagram illustrating another feature in accordance with one aspect of the present invention. For example, when an operator must turn off loader 10, and leave operating compartment 16, many times during operation, it may be inconvenient for the operator to be required to continually re-enter the user password each time the operator would like to restart loader 10. Therefore, in accordance with one aspect of the present invention, controller 52 allows the operator to disable (or unlock) the level one password requirement described with respect to FIG. 12. This is illustrated in the flow diagram of FIG. 13.

FIG. 13 starts under the assumption that loader 10 is powered up (e.g., that a valid level one password has been entered). This is indicated by block 200.

Then, the operator provides an input (such as through control panel inputs 54) indicating a desire to power down loader 10. This is indicated by block 202. Controller 52 then provides output signals to the appropriate outputs to power down loader 10. This is indicated by block 204. However, controller 52 maintains power to itself and to display panel device 67 and control panel inputs 54. In doing so, controller 52 provides an output to display panel devices 67 which display, for view by the user, a reminder that the user has disabled (or unlocked) the password feature illustrated in FIG. 12. This is indicated by block 206. The user is then allowed an opportunity to actuate one of the control panel inputs 54 to relock the system, or to re-engage the password function illustrated by FIG. 12. This may be helpful, for example, if the operator has finished a shift or is at the end of the day. Therefore, controller 52 allows the operator an opportunity to re-engage that feature when power down of loader 10 has been requested.

In one illustrative embodiment, controller 52 simply displays the unlock reminder for a predetermined time period. Once that time period has elapsed, if controller 52 has not received an input from the operator to relock the system, controller 52 simply powers down the system in the unlocked condition. This is indicated by blocks 208 and 210.

However, if, before the predetermined time period has elapsed, controller 52 has received an input from the user through control panel inputs 54 indicating that the operator desires to lock the system, controller 52 re-engages the password locking feature illustrated in FIG. 12, such that the system cannot be powered up unless a valid user password has been entered by the operator. This is indicated by blocks 208 and 212.

Figure 14:
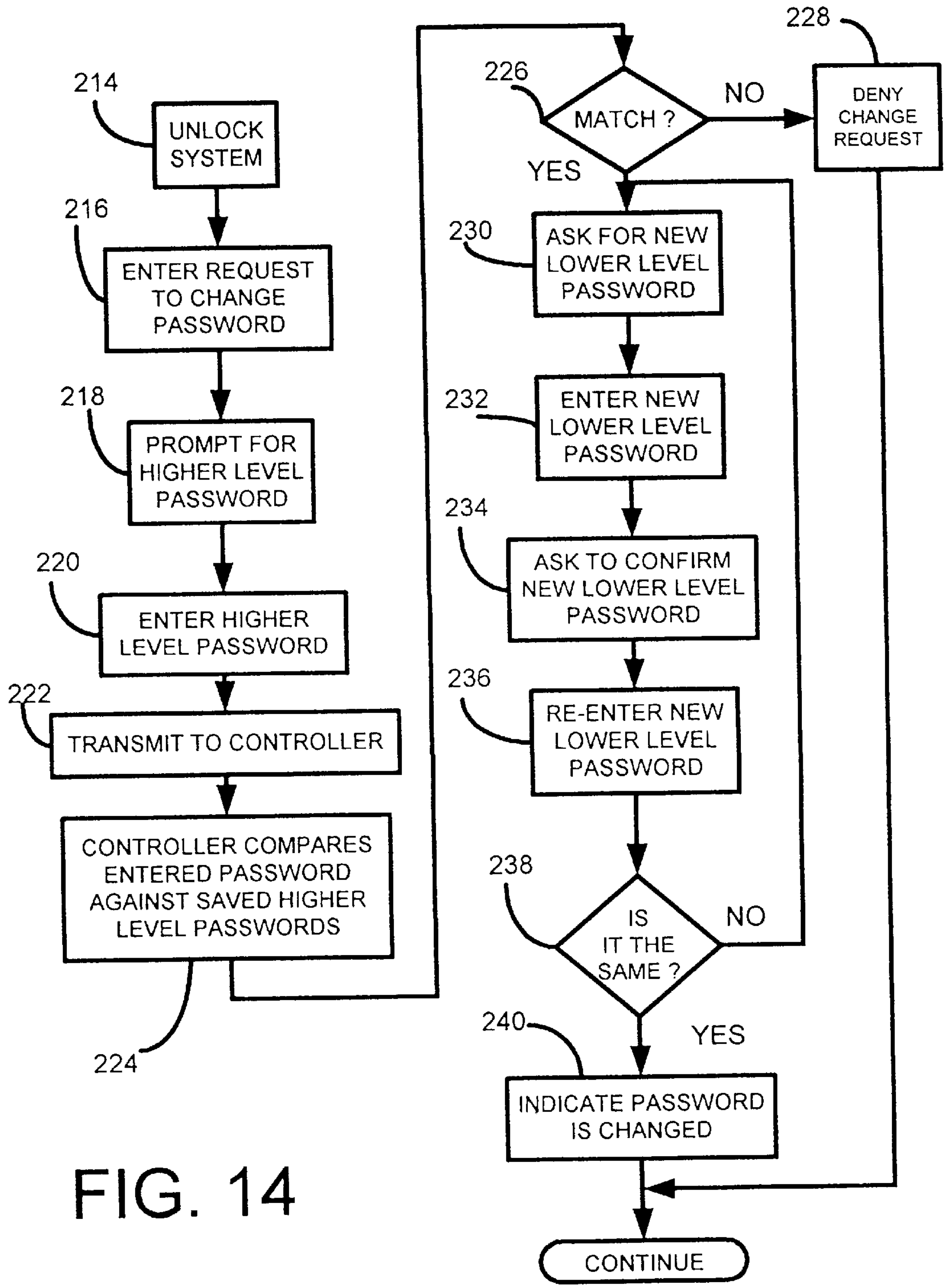

FIG. 14 is a block diagram illustrating how certain passwords are changed. For example, as discussed above, an owner may wish to activate, deactivate, or change user passwords. Similarly, one who possesses the master password may wish to activate, de-activate, or change owner or user passwords. In that case, the entity desirous of changing a password must simply possess a higher level password. This is more completely illustrated with reference to FIG. 14.

In order to change a password, the operator must first unlock system 50, such as by entering a valid level one (user) password. This is indicated by block 214.

Once the system is unlocked, the user may request, through an appropriate input or series of inputs at control panel inputs 54, to change a password. This is indicated by block 216. At that point, controller 52 prompts the user for the higher level password. For instance, if an owner wishes to change, activate, or de-activate a user password, the owner is prompted for the owner level password. This is indicted by block 218. The owner then enters the higher level password, as indicated by block 220, and that password is again transmitted to controller 52, as indicated by block 222.

Upon receiving the higher level password, controller 52 accesses the password memory and compares the higher level password against the higher level passwords stored in the password memory associated with controller 52. This is indicated by block 224. If a match is not found, controller 52 denies the request to modify the user password list, and displays a message for the user to that effect on display panel devices 67. This is indicated by blocks 226 and 228.

However, if, at block 226, a match is found, then controller 52 allows the owner to modify the user level passwords. In one illustrative embodiment, controller 52 displays a list of the current user level passwords on display panel devices 67 and allows the user to select passwords from that list for modification, deletion, or activation.

For example, if the owner wishes to change one of the user level passwords, the owner can select that password from the list by providing a suitable input from control panel inputs 54. Controller 52 then prompts the user for the new owner level password. This is indicated by block 230. The owner then enters the new user level password and controller 52 asks the owner to confirm the new password. This is indicated by blocks 232 and 234. The owner then re-enters the new user level password, as indicated by block 236, and controller 52 assures that the reentered password is confirmed. This is indicated by block 238. If not, controller 52 asks the owner to again enter and validate the new user password. However, if the new user password has been validated, controller 52 updates the password memory with the new user level password and provides an indication to the owner, on display panel devices 67, indicating that the password has been so modified. This is indicated at block 240.

While the above discussion of FIG. 14 has proceeded with respect to the modification of a user level password, it will be appreciated that more or fewer levels of passwords can be provided and modification of any level can be accomplished in substantially the same way, by simply possessing a higher level password.

It should also be noted that controller 52 can be programmed to accommodate modification of one level password if that same level password is known. For example, controller 52 can be programmed to allow a user to change his or her own password, simply by knowing the current user password. Such a hierarchy can be implemented in the same fashion as discussed with respect to FIG. 14.

Figure 15:
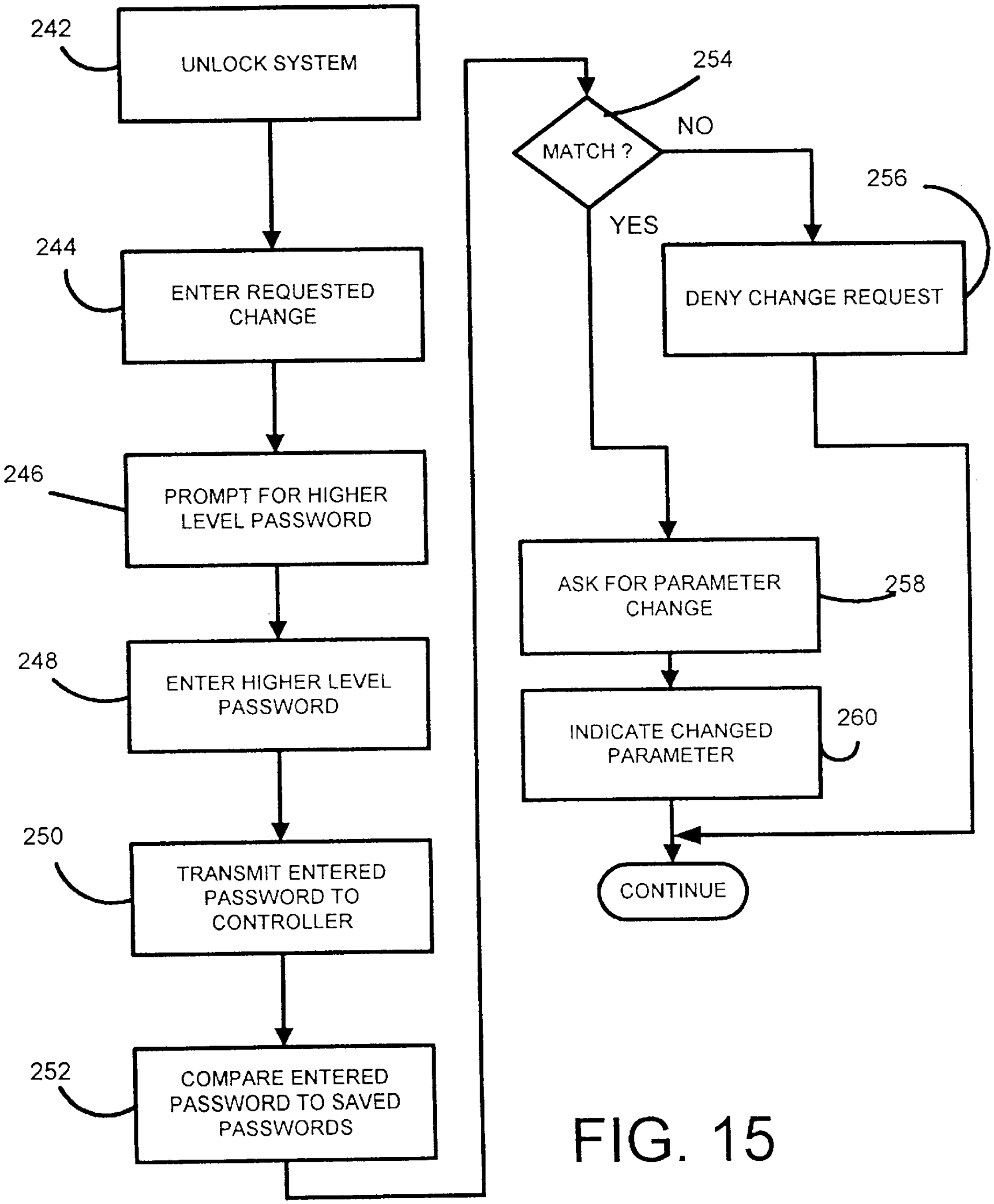

FIG. 15 is a flow diagram illustrating another password feature in accordance with one aspect of the present invention. FIG. 15 illustrates that those who possess certain levels of passwords may be provided with different access to control system 50. For example, those who possess the master or owner passwords may be provided with higher level access to system 10 than those who simply possess the user passwords. Similarly, those who possess the master password may be provided with additional access to system 50, over and above those who possess only the owner password. This is more completely illustrated with respect to FIG. 15.

FIG. 15 proceeds with a description relating to how system 50 allows an operator to change a system setting or operational parameter by entering the appropriate level password. In order to accomplish this, the operator must first unlock the system by entering at least the user level or level one password. This is indicated by block 242. Next, the operator provides an input, through control panel inputs 54, requesting the ability to change a setting or parameter for loader 10. For instance, the operator may wish to unlock the two speed feature which would allow the operator to change between multiple speeds of operation, simply by actuating an input on control panel inputs 54. This is indicated by block 244.

Upon requesting the ability to change a system setting, controller 52 can take a number of different actions. For example, controller 52 can simply determine the level of the password entered by the operator in powering up the system. If the password is a high enough level, controller 52 will allow the requested change. If not, the change will be disallowed. Alternately, controller 52 can be configured to prompt the user for the appropriate higher level password by providing a prompt display asking the user to enter the password, on display panel devices 67. This is indicated by block 246. The user then enters the higher level password through control panel inputs 54. This is indicated by block 248. That higher level password is then transmitted to controller 50 where it is compared against the higher level passwords contained in the password memory. This is indicated by blocks 250 and 252. If no match is found, controller 52 displays, for view by the operator, a message indicating that the change request has been denied. This is indicated by blocks 254 and 256.

However, if a match is found at block 254, then controller 52 prompts the user, through a message displayed at display panel devices 67, asking the user to indicate which parameter the operator wishes to change. This is indicated by block 258. The operator then enters an input, or a sequence of inputs, through control panel inputs 54 indicating the particular setting which the operator wishes to change. This is transmitted to controller 52 which then reconfigures itself to change operation of system 50 in accordance with the selected change. The change is then indicated to the operator through another displayed message at display panel devices 67. This is indicated by block 260.

The change functionality described with respect to FIG. 15 can be implemented for substantially any system setting. In other words, controller 52 can be programmed to allow or disallow certain functionality, to change speed settings, to change transition profiles, etc. Any of these functions or features can be hierarchally protected such that only a person who possesses the appropriate level password will be given the ability to make such changes. This significantly enhances the functionality of loader 10 over prior systems.

Operator I/O Computer Module Detection and Operation

Figure 16:
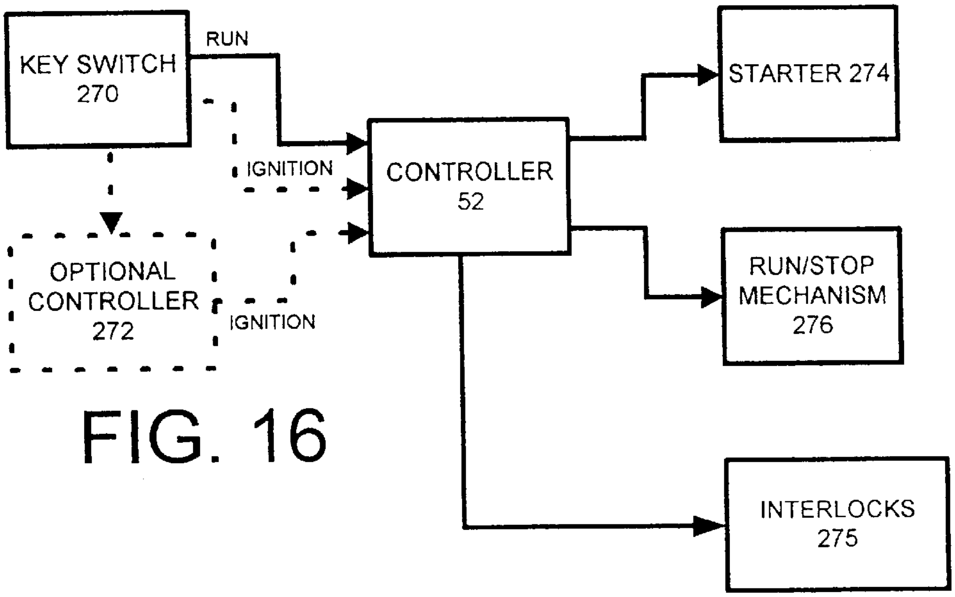
FIGS. 16 and 17 are alternative embodiments of the present invention.

FIG. 16 is a block diagram of a portion of control system 50 in which control panel inputs 54 have been replaced by keyswitch input 270 and optional controller 272. FIG. 16 also shows controller 52 coupled to starter 274, run/stop mechanism 276, and interlocks 275. In one illustrative embodiment, keyswitch 270 is a conventional keyswitch which has a start or ignition position which causes the engine to be started, a run position to which the key moves after the engine is started and the engine is running, and an off position which causes the engine to be turned off. In one illustrative embodiment, keyswitch 270 has all three positions coupled directly to controller 52. In that embodiment, controller 52 simply senses the position of keyswitch 270 and controls starter 274 and run/stop mechanism 276 (described in greater detail below) accordingly based on the position of keyswitch 270.

In another embodiment, keyswitch 270 is also coupled to an optional input controller 272. In that embodiment, keyswitch 270 can have its run and stop positions coupled directly to controller 52, while having the ignition position coupled to optional controller 272. In accordance with that embodiment, controller 52 receives the ignition signal (such as through serial communication) from optional controller 272 which provides the ignition signal to controller 52 upon sensing that keyswitch 270 has been moved to the ignition or start position.

Starter 274 can be embodied, as discussed above, as an electromechanical device 66 (such as a starter coil). Of course, starter 274 can be embodied as any other suitable starter mechanism as well.

Similarly, run/stop mechanism 276 can be any electromechanical, electrical, or hydraulic, device which can be used to control whether the engine is running or stopped. For example, run/stop mechanism 276 can be an electronically operated coil which controls a solenoid on the fuel shut-off valve. In that instance, the coil can be controlled to inhibit fuel flow to the engine, thereby turning off the engine.

Further, interlocks 275 can illustratively be implemented as mechanisms which lock traction and hydraulic functions of loader 10 until certain operating conditions are observed. Interlocks 275 are illustratively embodied as a computer controlled system for enabling operation of the traction function and certain hydraulic functions based on inputs from sensors sensing any desired operating conditions such as, for example, operator presence, seat bar position, override inputs, etc.

Controller 52 receives a run signal from keyswitch 270 indicating that the key is in the run position, and a stop signal indicating that the key has been moved to the stop position. In order to start the engine, controller 52 waits until it receives the ignition signal from keyswitch 270 or optional controller 272 and then causes starter 274 to start the engine. Controller 52 controls run/stop mechanism 276 to maintain the engine in the running state, until it receives the stop signal from keyswitch 270 (indicating that the key has been moved to the stop position).

Figure 17:
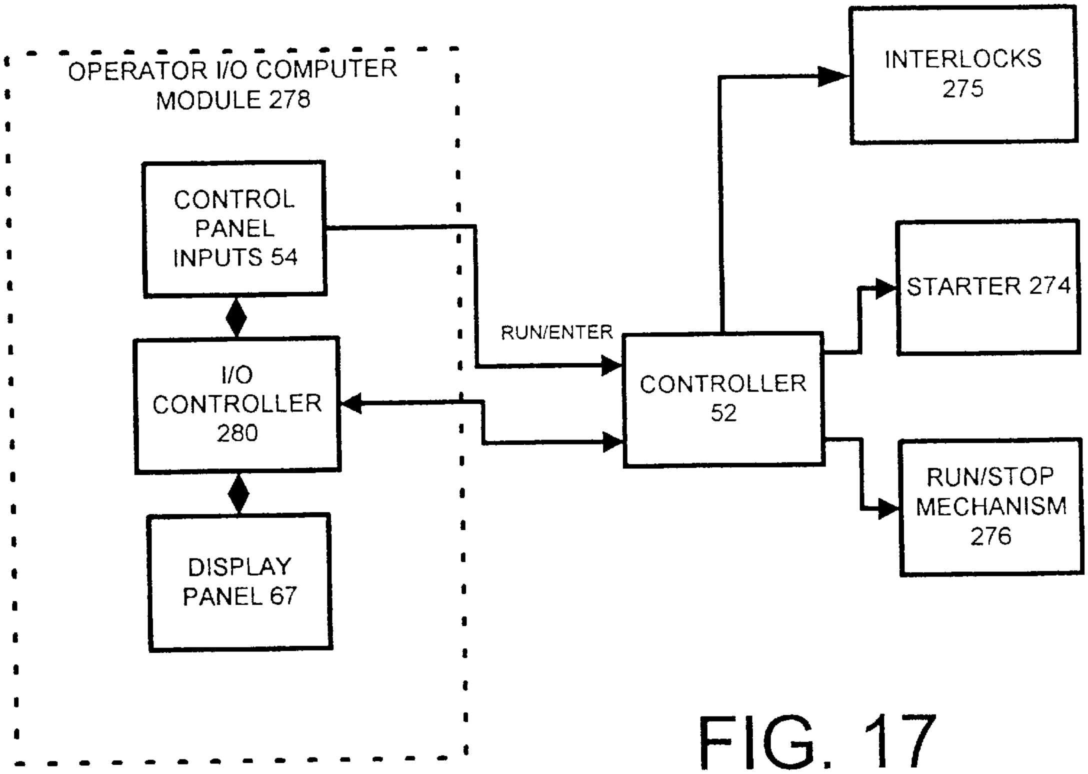

FIG. 17 is a block diagram of another embodiment of a portion of system 50 in accordance with one aspect of the present invention. In the embodiment illustrated in FIG. 17, conventional keyswitch 270 has been replaced by operator input/output (I/O) computer module 278. In that embodiment, a user input device and a user display device (such as control panel inputs 54 which are described above, and display panel 67, which is also described above) are both coupled to an I/O controller 280. I/O controller 280, in turn, is coupled to controller 52 through serial, parallel, wireless, or any other suitable data transmission link. In one embodiment, control panel inputs 54 are embodied as a keypad input, or a touch sensitive screen input, etc. Similarly, in one embodiment, display panel 67 is embodied as an LCD panel, a CRT-type display device, or a plasma display, etc.

In the embodiment illustrated in FIG. 17, control panel inputs 54 include a run/enter input which, when actuated by the operator, provides a signal directly to controller 52. Other inputs from control panel inputs 54 are provided to I/O controller 280 which sends a packet, or stream, of data indicative of those user inputs, to controller 52. Controller 52, in turn, controls starter 274 and run/stop mechanism 276 based on the operator inputs. In addition, controller 52 provides data back to I/O controller 280 which is used by I/O controller 280 in generating display information provided to display panel 67 in order to generate a suitable display for the user.

Therefore, in the embodiment illustrated in FIG. 17, controller 52 can implement the password features described above in order to power up loader 10. For instance, the operator can touch the run/enter key on control panel inputs 54 to wake up controller 52. Controller 52 then provides information to I/O controller 280 causing display panel 67 to display a prompt for the level one password (described with respect to FIG. 12). Once the appropriate password has been entered, the operator can enter a desired key sequence to start the engine on loader 10. Similarly, the operator can perform any of the password features described with respect to FIGS. 13–15 discussed above.

In one illustrative embodiment, loader 10 can be retrofit with operator I/O computer module 278. In other words, loader 10 can originally be provided with only keyswitch 270, and can later have keyswitch 270 removed and operator I/O computer module 278 assembled thereon, in place of keyswitch 270. Examples of such modular keyswitch panels and operator I/O computer modules are shown in the above-referenced design patent applications, which are hereby incorporated by reference.

When operator I/O computer module 278 is present, and upon power up, I/O controller 280 preferably provides a signal to controller 52 indicating that module 278 is present, rather than keyswitch 270. Controller 52 can then take appropriate action based on expected inputs from module 278, rather than expected inputs from keyswitch 270.

In an embodiment illustrated herein, controller 52 automatically senses whether keyswitch 270 is present on loader 10, or whether operator I/O computer module 278 is present, and configures itself for proper operation based on that determination.

Figure 18:
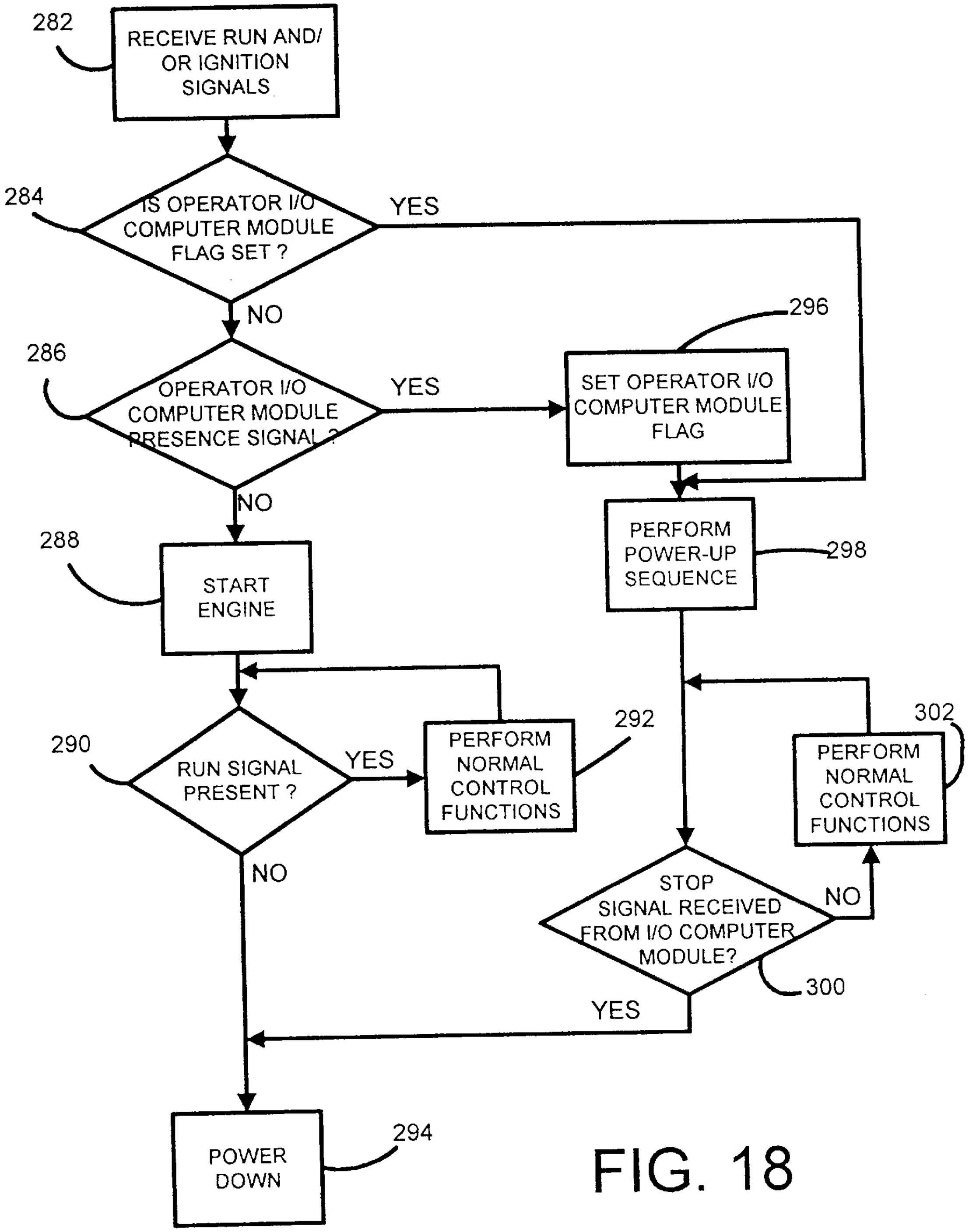
FIG. 18 is a flow diagram illustrating the operation of the systems shown in FIGS. 16 and 17.

FIG. 18 is a flow diagram illustrating the operation of controller 52 in determining whether loader 10 is provided with keyswitch 270 or operator I/O computer module 278. Controller 52 first receives the run and/or ignition signal. This is indicated by block 282. It is worth noting that, at this point, controller 52 may not yet know whether it is coupled to keyswitch 270 or operator I/O computer module 278. Controller 52 then determines whether a flag referred to herein as the operator I/O computer module flag is set. This is indicated by block 284. If the flag is not set, that indicates that controller 52 still does not know whether it is coupled to keyswitch 270 or operator I/O computer module 278. Therefore, controller 52 determines whether it is receiving the operator I/O computer module presence signal from I/O controller 280. This is indicated by block 286.

If the module presence signal is not being received by controller 52, controller 52 determines that it is currently coupled to a keyswitch 270. Then, so long as the run signal is present from keyswitch 270, controller 52 simply performs normal control functions. This is indicated by blocks 290 and 292. However, when the run signal from keyswitch 270 disappears, that indicates that the key has been turned to the off or stop position. Therefore, controller 52 powers down. This is indicated by block 294.

If, at block 286, controller 52 determines that it is receiving the module presence signal from operator I/O computer module 278, controller 52 is receiving that signal, but the operator I/O computer module flag is not set. Therefore, this is the first run cycle during which controller 52 has been coupled to module 278. Controller 52 thus sets the operator I/O computer module flag such that it "remembers" during subsequent run cycles, that it is coupled to a module 278, rather than a keyswitch 270. This is indicated by block 296.

In an illustrative embodiment, controller 52 has the master password and a default owner password stored in the password memory associated therewith. Therefore, controller 52 performs the power up sequence described in greater detail with respect to FIG. 12 (such as by asking for an appropriate password before unlocking the system and allowing the engine to be started). This is indicated by block 298 in FIG. 18.

Controller 52, knowing it is coupled to a module 278 rather than a keyswitch 270, then configures itself such that it must wait to receive the engine stop signal from I/O controller 280, rather than directly from a keyswitch 270 before it turns off the engine. Therefore, even if the run/enter signal disappears, controller 52 will maintain the engine in the running state until the operator provides the necessary inputs to controller 280 (through control panel inputs 54) indicating that the operator desires to turn off the engine. At that point, I/O controller 280 will provide a message to controller 52 indicating that the operator wishes to turn off the engine, and controller 52 will control run/stop mechanism 276 accordingly. Until controller 52 receives the stop signal from I/O controller 280, it will simply perform normal control functions. This is indicated by blocks 300 and 302.

Finally, during a subsequent run cycle, once controller 52 receives the run and/or ignition signal, it determines, at block 284, that the operator I/O computer module flag has been set. In that case, controller 52 presumes that it is still coupled to a module 278, rather than a keyswitch 270, and control jumps to block 298 where controller 52 implements the power up sequence as described with respect to FIG. 12.

It may be desirable, if loader 10 has a module 278 rather than a keyswitch 270, to retrofit loader 10 with a keyswitch 270, rather than a computer module 278. In that instance, which is referred to herein as a downgrade, controller 52 implements a downgrade method which precludes replacing the panel containing module 278 with a panel containing keyswitch 270, unless the operator undertakes a specific, predetermined sequence. One such sequence is illustrated by the flow diagram set out in FIG. 19.

Figure 19:
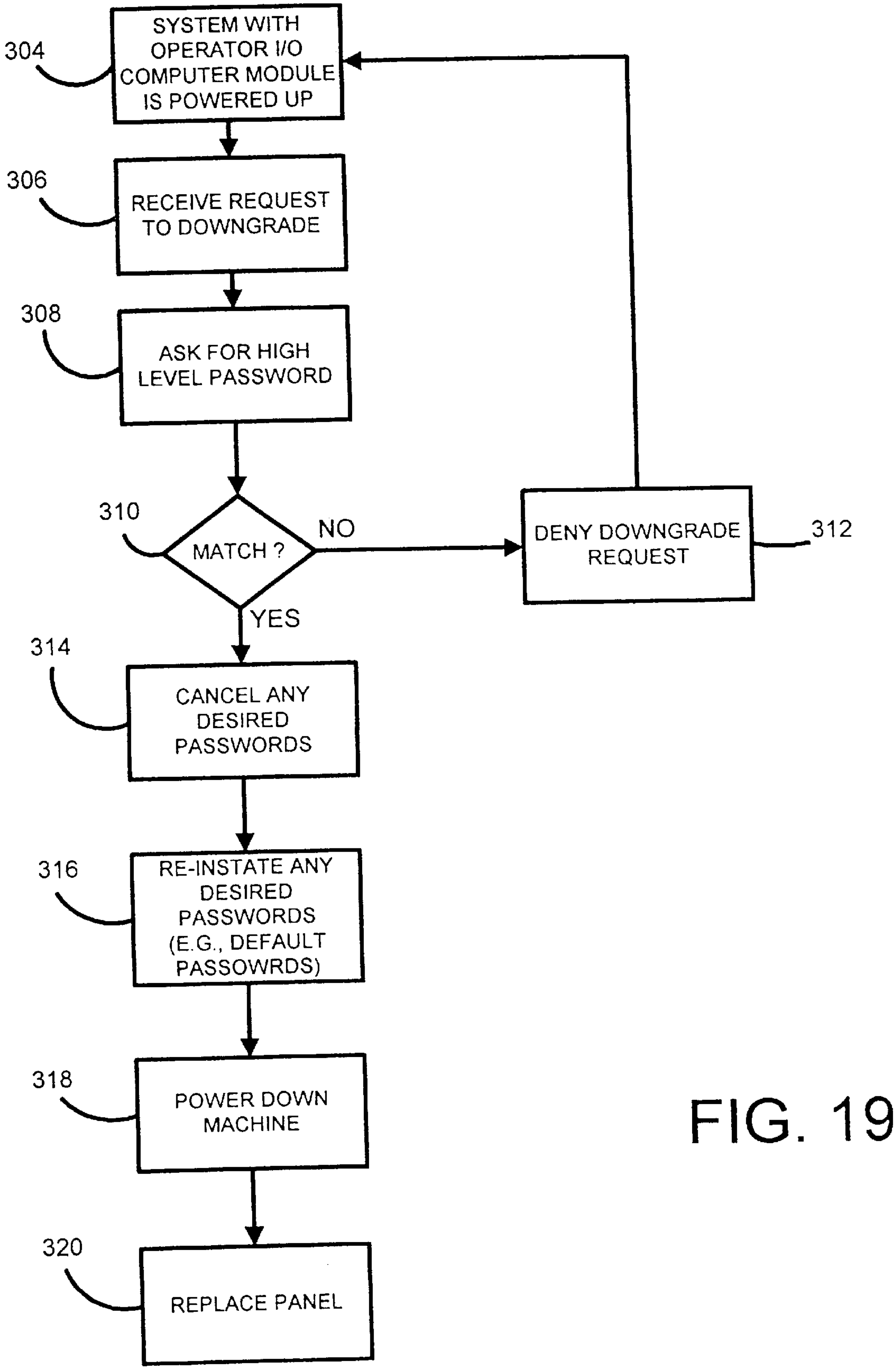
FIG. 19 is a flow diagram illustrating a downgrading operation in accordance with one feature of the present invention.

The flow diagram illustrated in FIG. 19 assumes that the controller 52 is coupled to an operator I/O computer module 278, and that the system is powered up. This is indicated by block 304. In order to downgrade to a keyswitch-type panel, in one illustrative embodiment, the operator must enter a request, through control panel inputs 54 and I/O controller 280, indicating that the operator wishes to downgrade the system. Controller 52 then receives information indicative of that request, from controller 280. This is indicated by block 306.

In response, controller 52 prompts the user for a high level password (such as the master password). In doing this, controller 52 illustratively provides a message to I/O controller 280 which causes I/O controller 280 to display a desired message on display panel 67 requesting that the operator enter such a password. This is indicated by block 308. In response, the operator enters the password through control panel inputs 54 and I/O controller 280, into controller 52. Controller 52 then accesses its password memory to determine whether the entered password matches the high level password stored in the password memory. This is indicated by block 310. If the entered password does not match, controller 52 denies the downgrade request and provides a signal to I/O controller 280 which causes a display to be displayed on display panel 67 indicating to the operator that the password does not match and the requested downgrade has been denied. This is indicated by block 312.

If, at block 310, the entered password does match the master password in the password memory, controller 52, in one illustrative embodiment, cancels any desired passwords which have been entered (such as all user passwords). This is indicated by block 314. Controller 52 then reinstates any desired passwords (such as the default owner password) thus negating changes to passwords which have been made during previous operation. This is indicated by block 316. Controller 52 then causes the system to be powered down, as indicated by block 318. The operator or user can then replace the module 278 with keyswitch 270 as indicated by block 320. Upon a subsequent power up, controller 52 again executes the algorithm illustrated in FIG. 18, determines that it is coupled to a keyswitch 270 rather than a module 278, and controls the system appropriately.

In operating in this way, controller 52 ensures that module 278 cannot be surreptitiously removed and replaced with a simple keyswitch. Instead, the downgrade requires knowledge of a high level password (such as the master or owner password). If such a surreptitious downgrade is attempted, controller 52 detects this and inhibits operation of the loader.

CONCLUSION

It can be seen that the present invention provides a significant number of features, each of which provides advantages over prior art systems.

The present invention is directed to a computer based control system for controlling hydraulic and electromechanical actuators on a power machine, such as a skid steer loader. The computer based control system is configured to implement a number of features to enhance certain operational aspects of the power machine.

In one embodiment, the present invention provides selectable control of auxiliary hydraulics on the power machine. In accordance with another feature of the present invention, substantially any hydraulic function can be placed in a detent position. Similarly, assuming that the power machine is hydraulically capable, a plurality of functions can be placed in detent position.

In accordance with another feature of the present invention, a spool lock control solenoid is provided with modulated control. This allows the spool lock to be unlocked in accordance with a power saving technique.

Another aspect of the present invention allows multiple speed control of the loader. Similarly, a transition between the low and high speed is modulated to accomplish smooth speed transitions.

The present invention also provides a number of features with respect to electric or electronically controlled outputs. For example, the state of the engine is monitored such that the starter will not be activated while the engine is running. In addition, the state of a plurality of relays is monitored for proper operation. Similarly, the electrical configuration in a number of relays is also monitored for proper control.

In accordance with another aspect of the present invention, a hydraulic fan speed is controlled based on a number of criteria. The criteria can include operating parameters of the power machine.

The present invention also provides a password hierarchy and functionality for limiting access to certain functions based on the level of a password possessed by the user. Locking and unlocking functionality is also provided to allow re-starting the power machine without re-entering a password.

Further, one embodiment of the present invention allows upgrading an operator input panel from a key-type ignition input to include a keypad input and display device. The update procedure is substantially automated and precludes downgrades without appropriate authority as evidenced by, for example, knowledge of a high level password.

Although the present invention has been described with reference to preferred embodiments, workers skilled in the art will recognize that changes may be made in form and detail without departing from the spirit and scope of the invention.

What is claimed:

1. A power machine control system for a power machine having an engine, a hydraulic power system providing hydraulic fluid under pressure, and a hydraulic actuator, the control system comprising:

an engine speed sensor for sensing a speed of the engine;

a proportionally controllable valve controllably coupling the hydraulic fluid under pressure to the hydraulic actuator; and a controller coupled to the engine speed sensor and the valve, providing a modulated control signal to the valve and configured to vary the modulated control signal based on engine speed, wherein the modulated control signal has a variable duty cycle and wherein the controller is configured to vary the duty cycle based on the sensed engine speed.

2. The control system of claim 1, wherein the controller includes an associated memory storing a plurality of duty cycle profiles corresponding to a plurality of engine speeds and wherein the controller is configured to access the memory and provide the modulated control signal based on a duty cycle profile accessed in response to the sensed engine speed.

3. A power machine control system for a power machine having an engine, a traction system coupled to the engine to move the power machine, a hydraulic power system providing hydraulic fluid under pressure, the control system comprising:

a user actuable speed select input providing a speed select signal indicative of a request to operate at a selected one of a plurality of speeds, the speed being determined based on a position of a hydraulic speed valve providing hydraulic fluid under pressure to the traction system;

a controller coupled to the speed select input and providing a modulated output signal to operably control the speed valve to transition from a first position associated with a first speed to a second position associated with the selected speed, based on the speed select signal.

4. The control system of claim 3 wherein the controller includes associated memory storing a speed modulation profile and wherein the controller is configured to provide the modulated output signal according to the speed modulation profile.

5. The control system of claim 4 wherein the memory stores a plurality of speed modulation profiles each used by the controller under predetermined operating conditions.

6. The control system of claim 3 wherein the controller is configured to provide the modulated output signal to control movement of the speed valve from the first to the second position at a first speed during a first portion of the transition and at a second speed during a second portion of the transition.

7. The control system of claim 6 wherein the first speed is greater than the second speed.

8. The control system of claim 3 wherein the controller is configured to provide the modulated output signal to control movement of the speed valve from the first to the second position at a substantially constant rate of speed.

* * * * *